United States Patent
Hammarwall et al.

(10) Patent No.: US 9,560,540 B2
(45) Date of Patent: Jan. 31, 2017

(54) METHOD AND ARRANGEMENT IN A WIRELESS COMMUNICATION SYSTEM

(71) Applicant: Telefonaktiebolaget L M Ericsson (publ), Stockholm (SE)

(72) Inventors: David Hammarwall, Vallentuna (SE); Svante Bergman, Hägersten (SE); Jonas Fröberg Olsson, Ljungsbro (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 14/398,757

(22) PCT Filed: May 16, 2013

(86) PCT No.: PCT/SE2013/000080
§ 371 (c)(1),
(2) Date: Nov. 4, 2014

(87) PCT Pub. No.: WO2013/172760
PCT Pub. Date: Nov. 21, 2013

(65) Prior Publication Data
US 2015/0110064 A1  Apr. 23, 2015

Related U.S. Application Data

(60) Provisional application No. 61/707,566, filed on Sep. 28, 2012.

(30) Foreign Application Priority Data

May 16, 2012  (SE) ........................ 1200077

(51) Int. Cl.
*H04W 24/10* (2009.01)
*H04B 17/382* (2015.01)
(Continued)

(52) U.S. Cl.
CPC ........... *H04W 24/10* (2013.01); *H04B 17/382* (2015.01); *H04W 72/04* (2013.01); *H04B 7/024* (2013.01); *H04B 17/345* (2015.01)

(58) Field of Classification Search
CPC ..... H04B 17/345; H04B 17/382; H04B 7/024; H04W 24/10; H04W 72/04
(Continued)

(56) References Cited

U.S. PATENT DOCUMENTS

2004/0090938 A1* 5/2004 Hsu ................ H04B 7/086
370/335
2008/0307427 A1* 12/2008 Pi .................... H03M 13/27
718/104
(Continued)

FOREIGN PATENT DOCUMENTS

EP  2 426 971  3/2012

OTHER PUBLICATIONS

3G Evolution; HSPA and LTE for Mobile Broadband by Erik Dahlman et al. (485 pages)—2007.
(Continued)

*Primary Examiner* — Mohammad Anwar
*Assistant Examiner* — Kokou R Detse
(74) *Attorney, Agent, or Firm* — Baker Botts, LLP

(57) ABSTRACT

The invention relates to a method and an arrangement in a transmitting node (560) for enabling a receiving node (540) to perform measurements on interference caused by transmissions from at least one transmission point (510, 520, 530) controlled by the transmitting node (560) on receptions at the receiving node (540). The transmitting and receiving nodes (560, 540) are comprised in a wireless communications system (500, 600, 700). The transmitting node determines (910) an interference measurement resource, IMR, comprising a set of Time-Frequency Resource Elements,
(Continued)

TFREs, upon which the transmitting node is expected to transmit interference. The transmitting node then transmits (930) at least one interfering signal on said IMR as said interference. The at least one interfering signal comprises at least one of a desired signal, that is expected to be decoded or coherently measured upon by the receiving node (540) or another node (550) served by said transmitting node (560), and another signal, that is not expected to be decoded or coherently measured upon by any node (540, 550) served by said transmitting node (560). The desired signal is transmitted in place of the another signal as said at least one interfering signal on one or more TFREs of the IMR when the at least one transmission point is to transmit the desired signal to the receiving node (540) or to the another node (550). The another signal is transmitted on TFREs of said IMR where no desired signal is transmitted and the another signal is muted on TFRE's of said IMR where the desired signal is transmitted.

45 Claims, 15 Drawing Sheets

(51) Int. Cl.
*H04W 72/04* (2009.01)
*H04B 7/02* (2006.01)
*H04B 17/345* (2015.01)

(58) Field of Classification Search
USPC .......................................................... 370/330
See application file for complete search history.

(56) References Cited

U.S. PATENT DOCUMENTS

| | | | |
|---|---|---|---|
| 2011/0249637 A1 | 10/2011 | Hammarwall et al. | |
| 2011/0286376 A1* | 11/2011 | Yoo | H04W 56/00 370/312 |
| 2013/0102304 A1 | 4/2013 | Lee et al. | |
| 2013/0114438 A1* | 5/2013 | Bhattad | H04J 11/005 370/252 |
| 2013/0208604 A1* | 8/2013 | Lee | H04L 25/0226 370/252 |
| 2013/0279350 A1 | 10/2013 | Erickson et al. | |
| 2013/0286867 A1 | 10/2013 | Davydov et al. | |
| 2013/0301434 A1 | 11/2013 | Krishnamurthy et al. | |
| 2013/0301448 A1 | 11/2013 | Sayana et al. | |
| 2013/0301450 A1 | 11/2013 | Geirhofer et al. | |
| 2013/0301542 A1 | 11/2013 | Krishnamurthy et al. | |
| 2013/0301560 A1 | 11/2013 | Geirhofer et al. | |
| 2013/0308488 A1 | 11/2013 | Tong et al. | |
| 2014/0355469 A1 | 12/2014 | Kang et al. | |
| 2015/0023194 A1 | 1/2015 | Seo et al. | |
| 2015/0043469 A1 | 2/2015 | Kim et al. | |

OTHER PUBLICATIONS

PCT Notification of Transmittal of the International Preliminary Report on Patentability; International application No. PCT/SE2013/000080, Jul. 24, 2014.

PCT International Search Report for International application No. PCT/SE2013/000080, Jul. 9, 2013.

3GPP TSG RAN WG4 Meeting #66; St. Julian's, Malta; Title: Comp Interference averaging; R4-130528, Jan. 28-Feb. 1, 2013.

3GPP TSG RAN WG1 #68bis; Jeju, Korea; Title: Interference Measurements for CoMP CSI Reporting; R1-121741, Mar. 26-30, 2012.

3GPP TSG RAN WG1 #68bis; Jeju, Korea; Title: CQI Definition of UE Emulated Intra CoMP Cluster Interference; R1-121740, Mar. 26-30, 2012.

3GPP TSG RAN WG1 meeting #69; Prague, Czech; Title: Interference Measurement for CoMP, May 21-25, 2013.

EPO Communication Pursuant to Article 94(3) EPC for Application No. 12 725 166.8—1855—Sep. 9, 2015.

PCT Written Opinion of the International Searching Authority for International application No. PCT/SE2012/000077—Nov. 15, 2012.

3GPP TSG-RAN WG1 #68bis; Jeju, Korea; Source: Ericsson, ST-Ericsson; Title: CQI Definition of UE Emulated Intra CoMP Cluster Interference (R1-121740)—Mar. 26-30, 2012.

3GPP TSG-RAN WG1 #68bis; Source: Ericsson, ST-Ericsson; Title: Interference Measurements for CoMP CSI Reporting (R1-121741)—Mar. 26-30, 2012.

3GPP TSG RAN WG1 meeting #69; Prague, Czech; Source: Alcatel-Lucent, Alcatel-Lucent Shanghai Bell; Title: Interference Measurement for CoMP (R1-122482)—May 21-25, 2012.

Office Action issued by the USPTO for U.S. Appl. No. 14/398,873 by David Hammarwall—Feb. 16, 2016.

Office Action issued by the USPTO for U.S. Appl. No. 14/398,873 by David Hammarwall—Jun. 24, 2016.

\* cited by examiner

METHOD AND ARRANGEMENT IN A WIRELESS COMMUNICATION SYSTEM

PRIORITY

This nonprovisional application is a U.S. National Stage Filing under 35 U.S.C. §371 of International Patent Application Serial No. PCT/SE2013/000080, filed May 16, 2013 and entitled "*Method and Arrangement in a Wireless Communication System*," which claims priority to International Patent Application Serial No. PCT/SE2012/000077 filed May 16, 2012, entitled "*Method and Arrangement in a Wireless Communication System*"; and U.S. Provisional Application No. 61/707,566 filed Sep. 28, 2012.

TECHNICAL FIELD

The present disclosure relates generally to methods and arrangements in a wireless communications system. In particular it relates to interference measurements in a wireless communication system.

BACKGROUND

In a wireless communications system or cellular radio communications system wireless devices and/or user equipments, also known as mobile terminals and/or wireless terminals, communicate via a Radio Access Network (RAN) with one or more core networks. The user equipments may be mobile stations or user equipment units such as mobile telephones, also known as "cellular" telephones, and laptops with wireless capability, e.g., mobile termination, and may thus be, for example, portable, pocket, hand-held, computer-included, or car-mounted mobile devices which communicate voice and/or data via the radio access network. A wireless device may be any equipment being wirelessly connectable to a RAN for wireless communication.

The radio access network covers a geographical area which is divided into point coverage areas, traditionally denoted cells, with each point coverage area or cell being served by a base station, e.g., a Radio Base Station (RBS), which in some networks is also called "eNB", "eNodeB", "NodeB" or "B node" and which in this document also is referred to as a base station or radio network node. A point coverage area is a geographical area where radio coverage is provided by a point, also referred to as a "transmission point" and/or a "reception point", which is controlled by the radio base station or radio network node at a base station site or radio network node site. A point coverage area is often also denoted a cell, but the concept of a cell also has architectural implications and the transmission of certain reference signals and system information. More specifically, multiple point coverage areas may jointly form a single logical cell sharing the same physical cell ID. However, in the following the notation of a "cell" is used interchangeably with "point coverage area" to have the meaning of the latter. Moreover, a point, or "transmission point" and/or a "reception point", corresponds in the present disclosure to a set of antennas covering essentially the same geographical area in a similar manner. Thus, a point might correspond to one of the sectors at a site, e g a base station site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions.

The radio network node communicates over an air interface or radio interface with the user equipments within the range of the radio network node. One radio network node may serve one or more cells via one or more antennas operating on radio frequencies. The cells may be overlaid on each other, e g as macro and pico cells having different coverage areas, or adjacent to each other, e g as so called sector cells where the cells served by the radio network node each cover a section of the total area or range covered by the radio network node. The cells adjacent or overlaid relative to each other may alternatively or additionally be served by different or separate radio network nodes that may be co-located or geographically separated.

The one or more antennas controlled by the radio network node may be located at the site of the radio network node or at antenna sites that may be geographically separated from each other and from the site of the radio network node. There may also be one or more antennas at each antenna site. The one or more antennas at an antenna site may be arranged as an antenna array covering the same geographical area or arranged so that different antennas at the antenna site have different geographical coverage. An antenna array may also be co-located at one antenna site with antennas that have different geographical coverage as compared to the antenna array. In the subsequent discussion an antenna or antenna array covering a certain geographical area is referred to as a point, or transmission and/or reception point, or more specifically for the context of this disclosure as a Transmission Point (TP). In this context multiple transmission points may share the same physical antenna elements, but could use different virtualizations, e.g., different beam directions.

The communications, i e transmission and reception of signals between the radio access network and a user equipment, may be performed over a communication link or communication channel via one or more transmission and/or reception points that may be controlled by the same or different radio network nodes. A signal may thus, for example, be transmitted from multiple antennas by being transmitted via one transmission point from more than one antenna in an antenna array or by being transmitted via more than one transmission point from one antenna at each transmission point. The coupling between a transmitted signal and a corresponding received signal over the communication link may be modelled as an effective channel comprising the radio propagation channel, antenna gains, and any possible antenna virtualizations. Antenna virtualization is obtained by precoding a signal so that it can be transmitted on multiple physical antennas, possibly with different gains and phases. Link adaptation may be used to adapt transmission and reception over the communication link to the radio propagation conditions.

An antenna port is a "virtual" antenna, which is defined by an antenna port-specific reference signal. An antenna port is defined such that the channel over which a symbol on the antenna port is conveyed can be inferred from the channel over which another symbol on the same antenna port is conveyed. The signal corresponding to an antenna port may possibly be transmitted by several physical antennas, which may also be geographically distributed. In other words, an antenna port may be virtualized over one or several transmission points. Conversely, one transmission point may transmit one or several antenna ports.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) standard is currently evolving with enhanced MIMO support. A core component in LTE is the support of MIMO antenna deployments and MIMO related techniques. A current working assumption in LTE-Advanced, i e 3GPP Release-10, is the support of an eight-layer spatial multiplexing mode with possibly channel dependent precoding. The spatial multiplexing mode is aimed for high data rates in favourable channel conditions. An illustration of the spatial multiplexing mode is provided in FIG. 1. Therein, the transmitted signal, represented by an information carrying symbol vector s is multiplied by an $N_T \times r$ precoder matrix $W_{N_T \times r}$, which serves to distribute the transmit energy in a subspace of the $N_T$-dimensional vector space, corresponding to $N_T$ antenna ports. The precoder matrix is typically selected from a codebook of possible precoder matrices, and is typically indicated by means of a Precoder Matrix Indicator (PMI), which together with a Rank Indicator (RI) specifies a unique precoder matrix in the codebook. If the precoder matrix is confined to have orthonormal columns, then the design of the codebook of precoder matrices corresponds to a Grassmannian subspace packing problem. The r symbols in s each are part of a symbol stream, a so-called layer, and r is referred to as the rank or transmission rank. In this way, spatial multiplexing is achieved since multiple symbols can be transmitted simultaneously over the same Resource Element (RE) or Time-Frequency Resource Element (TFRE). The number of symbols r is typically adapted to suit the current channel properties.

LTE uses Orthogonal Frequency Division Multiplexing (OFDM) in the downlink, and Discrete Fourier Transform (DFT) precoded OFDM in the uplink. The basic LTE physical resource can be seen as a time-frequency grid, as illustrated in FIG. 2, where each time-frequency resource element (TFRE) corresponds to one subcarrier during one OFDM symbol interval, on a particular antenna port. The resource allocation in LTE is described in terms of resource blocks, where a resource block corresponds to one slot in the time domain and 12 contiguous 15 kHz subcarriers in the frequency domain. Two time-consecutive resource blocks represent a resource block pair, which corresponds to the time interval upon which scheduling operates.

The received $N_R \times 1$ vector $y_n$ for a certain resource element on subcarrier n or, worded differently, data RE number n or TFRE number n, assuming no inter-cell interference, is modeled by $$y_n = H_n W_{N_T \times r} s_n + e_n \quad (1)$$

where n denotes a transmission occasion in time and frequency, and $e_n$ is a noise and interference vector obtained as realizations of a random process. The precoder, or precoder matrix, for rank r, $W_{N_T \times r}$, can be a wideband precoder, which may be constant over frequency, or frequency selective.

The precoder matrix is often chosen to match the characteristics of the $N_R \times N_T$ MIMO channel $H_n$, also denoted channel matrix, resulting in so-called channel dependent precoding. When based on User Equipment (UE) feedback, this is also commonly referred to as closed-loop precoding and essentially strives for focusing the transmit energy into a subspace which is strong in the sense of conveying much of the transmitted energy to the UE or wireless device. In addition, the precoder matrix may also be selected to strive for orthogonalizing the channel, meaning that after proper linear equalization at the UE or wireless device, the inter-layer interference is reduced.

In closed-loop precoding, the UE or wireless device transmits, based on channel measurements in the forward link, i e the downlink, recommendations to the radio network node or base station of a suitable precoder to use. A single precoder that is supposed to cover a large bandwidth, so called wideband precoding, may be fed back. It may also be beneficial to match the frequency variations of the channel and instead feed back a frequency-selective precoding report, e.g. several precoders, one per subband. This is an example of the more general case of Channel State Information (CSI) feedback, which also encompasses feeding back other entities or information than precoders to assist the radio network node or base station in subsequent transmissions to the UE or wireless device. Such other information may include Channel Quality Indicators (CQIs) as well as Rank Indicator (RI).

In Release 8 and 9 of LTE the CSI feedback is given in terms of a transmission rank indicator (RI), a precoder matrix indicator (PMI), and channel quality indicator(s) (CQI). The CQI/RI/PMI report can be wideband or frequency selective depending on which reporting mode that is configured. This means that for CSI feedback LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state.

The RI corresponds to a recommended number of streams that are to be spatially multiplexed and thus transmitted in parallel over the effective channel. The PMI identifies a recommended precoder (in a codebook) for the transmission, which relates to the spatial characteristics of the effective channel. The CQI represents a recommended transport block size, i.e., code rate. There is thus a relation between a CQI and a Signal to Interference and Noise Ratio (SINR) of the spatial stream(s) over which the transport block is transmitted. Therefore, noise and interference estimates are important quantities when estimating, for example, the CQI, which is typically estimated by the UE or wireless device and used for link adaptation and scheduling decisions at the radio network node or base station side.

The term $e_n$ in (1) represents noise and interference in a TFRE and is typically characterized in terms of second order statistics such as variance and correlation. The interference can be estimated in several ways. For example, estimates may be formed based on TFREs containing cell specific RS since $s_n$ and $W_{N_T \times r}$ are then known and $H_n$ is given by the channel estimator. The interference may then be estimated as the residual noise and interference on the TFREs of the Cell Specific Reference Signal (CRS), after the known CRS sequence has been pre-subtracted, i.e., after the CRS has been cancelled. An illustration of CRS, sometimes read out as Cell-specific Reference Symbols, for Rel-8 of LTE can be seen in FIG. 3. It is further noted that the interference on TFREs with data that is scheduled for the UE in question can also be estimated as soon as the data symbols, $s_n$ are detected, since at that moment they can be regarded as known symbols. The latter interference can alternatively also be estimated based on second order statistics of the received signal and the signal intended for the UE of interest, thus possibly avoiding needing to decode the transmission before estimating the interference term. Alternatively the interference can be measured on TFREs where the desired signal, i e the signal intended for the UE of interest, is muted, so the received signal corresponds to interference only. This has the advantage that the interference measurement may be more accurate and the UE processing becomes trivial because no decoding or desired signal subtraction need to be performed.

In LTE Release-10, a new reference symbol sequence was introduced, the Channel State Information Reference Signal (CSI-RS), intended to be used for estimating channel state information. The CSI-RS provides several advantages over basing the CSI feedback on the CRS which were used, for that purpose, in previous releases. Firstly, the CSI-RS is not used for demodulation of the data signal, and thus does not require the same density. This means that the overhead of the CSI-RS is substantially less as compared to that of CRS. Secondly, CSI-RS provides a much more flexible means to configure CSI feedback measurements: For example, which CSI-RS resource to measure on can be configured in a UE specific manner. Moreover, antenna configurations larger than 4 antennas must resort to CSI-RS for channel measurements, since the CRS is only defined for at most 4 antennas.

A detailed example showing which resource elements within a resource block pair may potentially be occupied by UE-specific RS and CSI-RS is provided in FIG. 4. In this example, the CSI-RS utilizes an orthogonal cover code of length two to overlay two antenna ports on two consecutive REs. As seen, many different CSI-RS patterns are available. For the case of 2 CSI-RS antenna ports, for example, there are 20 different patterns within a subframe. The corresponding number of patterns is 10 and 5 for 4 and 8 CSI-RS antenna ports, respectively.

A CSI-RS resource may be described as the pattern of resource elements on which a particular CSI-RS configuration is transmitted. One way of determining a CSI-RS resource is by a combination of the parameters "resourceConfig", "subframeConfig", and "antennaPortsCount", which may be configured by Radio Resource Control (RRC) signaling.

Based on a specified CSI-RS resource, that defines an effective channel for the data transmission, and an interference measurement configuration, e.g. a muted CSI-RS resource, the UE can estimate the effective channel and noise plus interference, and consequently also determine which rank, precoder and transport format to recommend that best match the particular effective channel.

Furthermore, in order to improve system performance, for example by improving the coverage of high data rates, improving the cell-edge throughput and/or increasing system throughput, Coordinated Multipoint (CoMP) transmission and/or reception may be used in a wireless communications system or radio access network. In particular, the goal is to distribute the user perceived performance more evenly in the network by taking control of the interference in the system, either by reducing the interference and/or by better prediction of the interference. To harvest the gains of introducing coordinated transmission or CoMP feedback it is essential that a radio network node or base station, e g an eNodeB, can accurately predict the performance of a UE or wireless device for various coordinated transmission hypotheses, in order to select an appropriate downlink assignment. To this end, accurate interference measurements at a terminal are a key element for CSI reporting targeting different transmission hypotheses. However, current state of the art solutions for interference measurements are constrained by current standards and/or limitations imposed by UE specific muting of data channels, making accurate interference measurements difficult, in particular for CoMP systems employing dynamic point selection and/or joint transmission, where the transmission point association to a UE varies dynamically in time.

Moreover, it is often beneficial for a scheduler in a radio network node or base station such as an eNodeB to receive CSI reports that are based on a predictable and robust interference level. When a UE or wireless device measures interference caused by other data transmissions, the measured interference level will vary with the current traffic load and moreover will see rapid power variations due to the so called flash-light effect where dynamic precoding and/or beamforming in interfering points cause rapid and often unpredictable interference variations. For CSI reporting, such variations typically degrade the overall performance, since the measured interference often underestimates the interference seen at the subsequent data transmission allocation that is based on the CSI report. As a consequence, the radio network node or base station may have to reduce the data rate in the link adaptation to avoid excessive retransmissions due to uncertainties in the reported CQI.

To improve the possibilities for UEs to perform accurate interference measurements in a system zero-power (ZP) CSI-RS resources, also known as a muted CSI-RS have been introduced. The zero-power CSI-RS resources are configured just as regular CSI-RS resources, so that a UE knows that the data transmission is mapped around those resources. The intent of the zero-power CSI-RS resources is to enable the network to mute the transmission on the corresponding resources so as to boost the SINR of a corresponding non-zero power CSI-RS, possibly transmitted in a neighbor cell/transmission point. For Rel-11 of LTE, a special zero-power CSI-RS that a UE is mandated to use for measuring interference plus noise is under discussion. As the name indicates, a UE can assume that the TPs of interest are not transmitting on the muted CSI-RS resource and the received power can therefore be used as a measure of the interference plus noise level. For the purpose of improved interference measurements the agreement in LTE Release 11 is that the network will be able to configure a UE to measure interference on a particular Interference Measurement Resource (IMR) that identifies a particular set of TFREs that is to be used for a corresponding interference measurement.

However, reserving resources for specific purposes such as interference measurements reduces the resources available for data transmission. In some system configurations such reserved resources may give rise to a significant overhead, e g in the downlink when used to enable UEs to perform more reliable interference measurements.

Thus, there is a need for improving the efficiency in use of radio resources for reliably determining the interference that can be expected when receiving a signal over a communication channel from a radio access network.

SUMMARY

It is therefore an object of at least some embodiments of the present disclosure to reduce the overhead incurred by interference measurements in a wireless communications system.

According to a first embodiment of the present disclosure, this and other objects are achieved by a method in a transmitting node for enabling a receiving node to perform measurements on interference. The interference is caused by transmissions from at least one transmission point controlled by the transmitting node on receptions at the receiving node. The transmitting node and the receiving node are comprised in a wireless communications system. The transmitting node determines an interference measurement resource, IMR. The IMR comprises a set of Time-Frequency Resource Elements, TFREs, upon which the transmitting node is expected to transmit interference. The transmitting node transmits at least one interfering signal on the IMR as said interference. The at least one interfering signal comprises at least one of a desired signal and another signal. The desired signal is a signal that is expected to be decoded or coherently measured upon by the receiving node or another node served by the transmitting node. The another signal is a signal that is not expected to be decoded or coherently measured upon by any node served by the transmitting node. The desired signal is transmitted in place of the another signal as said at least one interfering signal on one or more TFREs of the IMR when the at least one transmission point is to transmit the desired signal to the receiving node or to the another node served by said transmitting node. The another signal is transmitted on TFREs of said IMR where no desired signal is transmitted and the another signal is muted on TFRE's of said IMR where the desired signal is transmitted.

According to a second embodiment of the present disclosure, this and other objects objects are achieved by a transmitting node for enabling a receiving node to perform measurements on interference. The transmitting node is configured to be connectable to at least one transmission point for communicating with the receiving node in the wireless communications system. Receptions at the receiving node may be susceptible to interference caused by transmissions from the at least one transmission point.

The transmitting node comprises processing circuitry. The processing circuitry is configured to determine an interference measurement resource, IMR. The IMR comprises a set of Time-Frequency Resource Elements, TFREs, upon which the transmitting node is expected to transmit interference. The processing circuitry is further configured to transmit, as said interference, at least one interfering signal on said IMR. The at least one interfering signal comprises at least one of a desired signal and another signal. The desired signal is a signal that is expected to be decoded or coherently measured upon by the receiving node or another node served by the transmitting node. The another signal is a signal that is not expected to be decoded or coherently measured upon by any node served by said transmitting node. The processing circuitry further configured to transmit the desired signal in place of the another signal as said at least one interfering signal on one or more TFREs of the IMR when the at least one transmission point is to transmit the desired signal to the receiving node or to the another node served by said transmitting node. The processing circuitry is further configured to transmit the another signal on TFREs of said IMR where no desired signal is transmitted and to mute the another signal on TFRE's of said IMR where the desired signal is transmitted.

The above object is achieved since the transmission of a desired signal that may be transmitted in place of the another signal as the at least one interfering signal on an IMR enables the overhead, incurred by enabling more reliable interference measurements according to different desired interference compositions through the use of IMRs, to be reduced in that more radio resources are made available for data transmission and other signaling intended to be decoded or coherently measured upon by receiving nodes in the wireless communication system.

DETAILED DESCRIPTION

Figure 1:
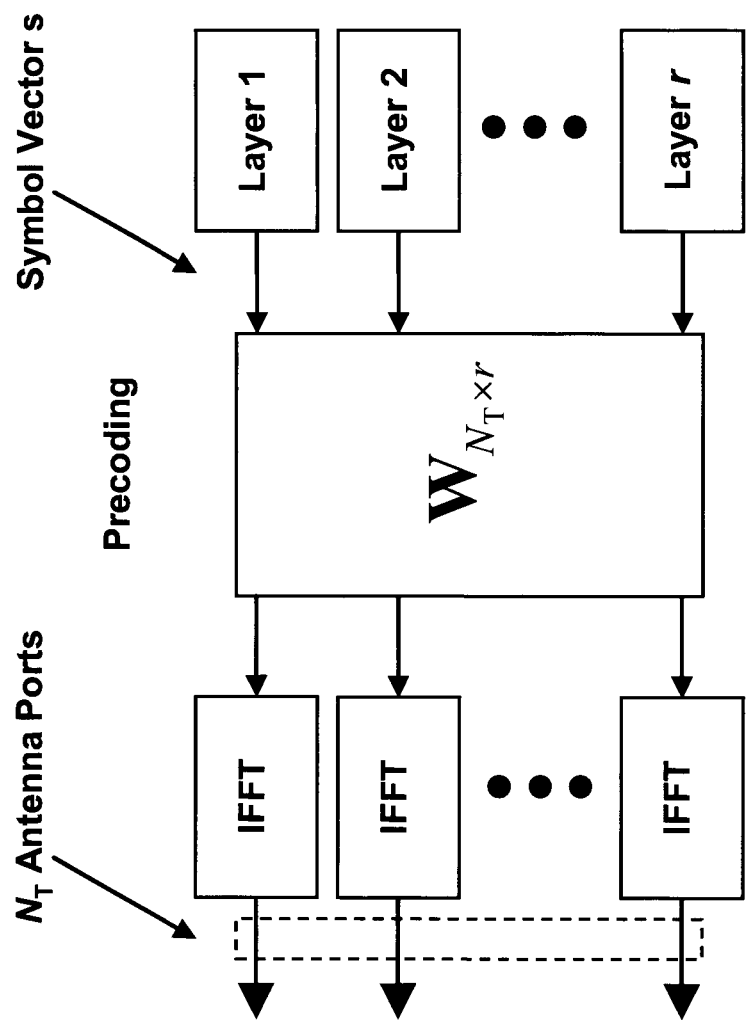
FIG. 1 is a schematic block diagram illustrating the transmission structure of the precoded spatial multiplexing mode in LTE.
Figure 2:
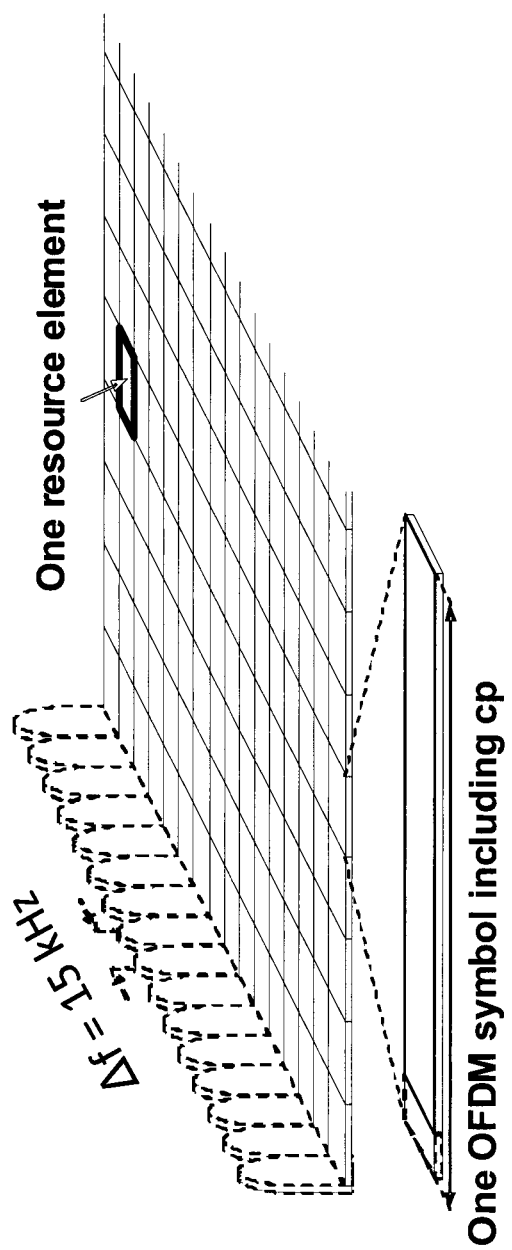
FIG. 2 is a schematic diagram illustrating the LTE time-frequency resource grid.
Figure 3:
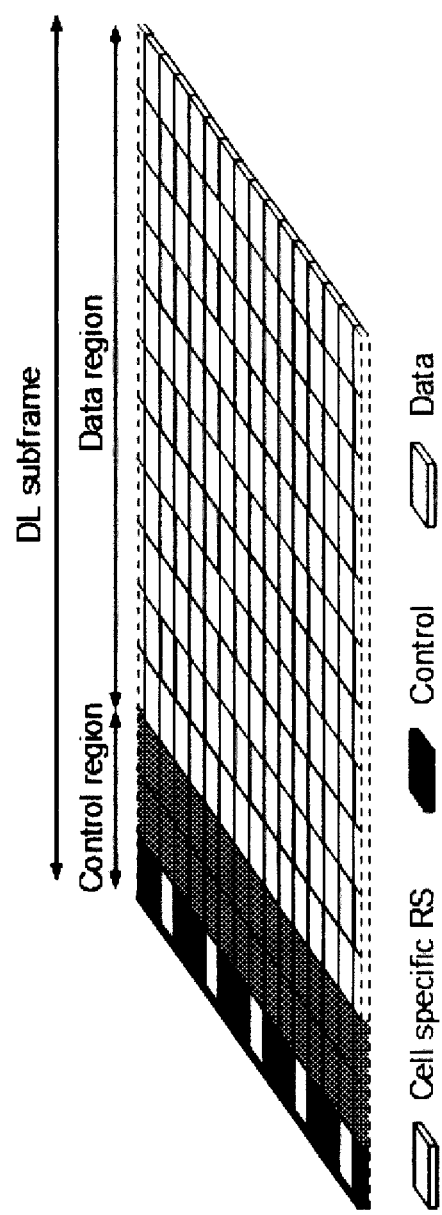
FIG. 3 is a schematic diagram illustrating cell-specific reference signals.
Figure 4:
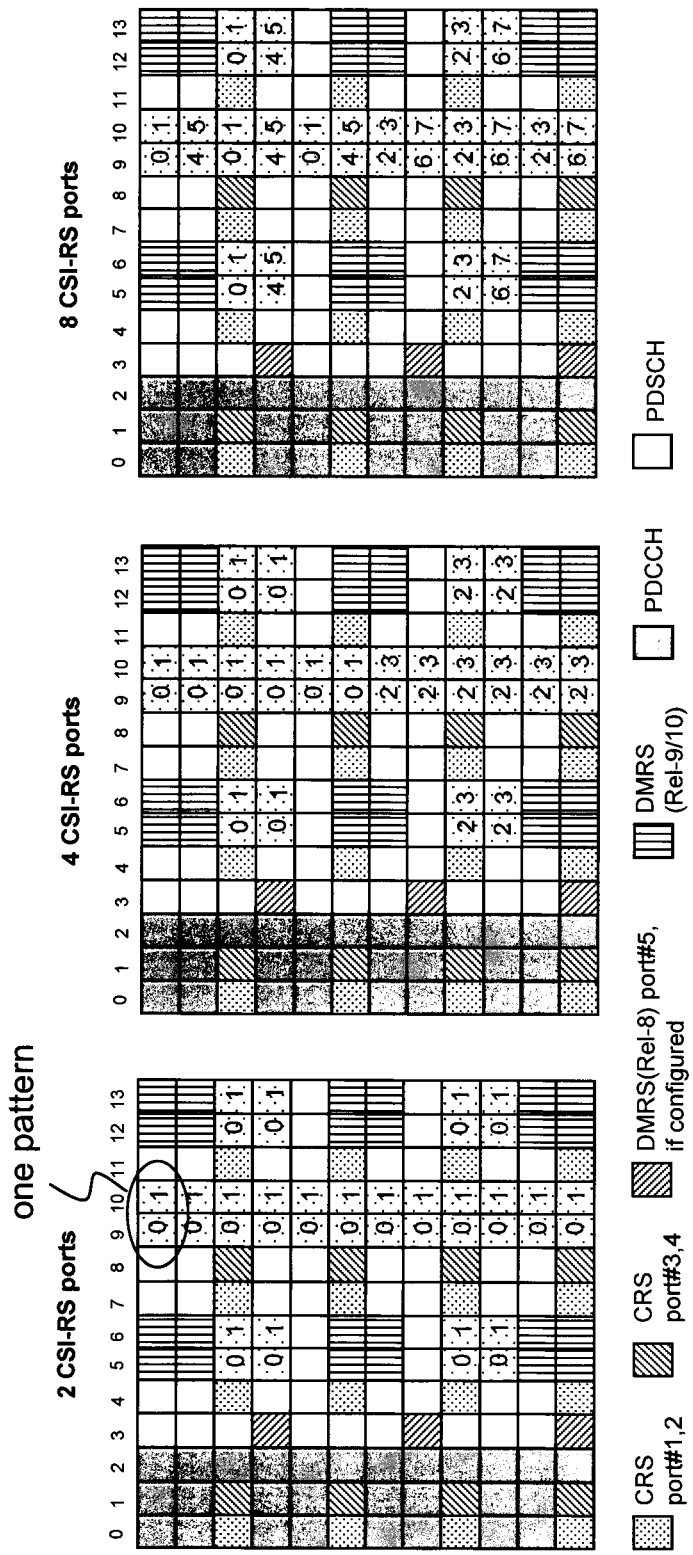
FIG. 4 is a schematic diagram showing example layouts of reference signals.

In this section, the invention will be illustrated in more detail by some exemplary embodiments. It should be noted that these embodiments are not mutually exclusive. Components from one embodiment may be tacitly assumed to be present in another embodiment and it will be understood by a person skilled in the art how those components may be used in the other exemplary embodiments.

It should be noted that although terminology from 3rd Generation Partnership Project (3GPP) LTE has been used in this disclosure to exemplify the invention, this should not be seen as limiting the scope of the invention to only the aforementioned system. Other wireless systems, including Wideband Code Division Multiple Access (WCDMA), Worldwide Interoperability for Microwave Access (Wi-Max), Ultra Mobile Broadband (UMB) and Global System for Mobile Communications (GSM) systems, may also benefit from exploiting the ideas covered within this disclosure.

Further, terminology such as eNodeB and UE should be considered as non-limiting and does in particular not imply a certain hierarchical relation between the two; in general the term "eNodeB" or base station could be considered as a first device, first node or transmitting node and the term "UE" could be considered as a second device, second node or receiving node, and these two devices communicate with each other over a radio channel that may be of various types, for example a multiple-input-multiple-output, "MIMO" channel. Herein, we also focus on wireless transmissions in the downlink, i e from the eNodeB to the UE, but the teachings of the embodiments described herein are equally applicable in the uplink, i e from the UE to the eNodeB. Thus, in such embodiments the receiving node may be the eNodeB or base station and the transmitting node may be the UE.

Generally, in systems with uncoordinated scheduling of downlink transmissions, the UE may effectively measure interference observed from other TPs, or other cells, when computing a recommendation for interference level and use this in an upcoming data transmission. Such interference measurements are typically performed by analyzing the residual interference on CRS resources (after the UE subtracts the impact of the CRS signal).

However, in the present disclosure, the inventors have realized that in some situations, when it is important to obtain an accurate interference measurement on a transmission resource, such as Time-Frequency Resource Elements (TFREs) of a radio transmission interface in a wireless communication system, such measurements may not be easily obtainable. This may for example be the situation when traffic load is low in a system and it is desired, e g for scheduling purposes, to determine how interference on a specific transmission resource would impact scheduling of a data transmission to a receiving node such as a UE. Another situation when it may be difficult to obtain an adequate measured interference level is when the transmission scheme of an interfering transmission point varies rapidly in an on-off way, e g from subframe to subframe. In such situations, i e when the interference measurements will not adequately reflect the interference situation, the CSI reporting for link adaptation and/or Coordinated Multipoint (CoMP) transmission will become corrupted. The term CoMP is sometimes understood to imply that different transmission points have different geographical locations. However, for the purposes of embodiments of this disclosure, the coordinated transmission aspect is relevant also for situations where transmission points involved in coordinated transmission have the same geographical location. For example, multiple transmission points may in this context share the same physical antenna elements, but could use different virtualizations, e.g., different beam directions, as mentioned in the earlier discussion about Transmission points herein.

As mentioned above, interference measurement resources (IMRs), are adopted by the LTE standard to enable the network to better control the interference measurements in the UEs. By muting a particular set of transmission points on a corresponding IMR a UE will only measure the residual interference caused by any non-muted transmission point in the vicinity.

To enable appropriate interference measurements by a receiving node in the above exemplified and similar situations the inventors propose in this disclosure to have at least some transmission point, or virtualization thereof, whose interference is desired in a particular IMR, to actively transmit an interfering signal on the time-frequency resource elements of the particular IMR. The interfering signal may be a signal that is independent of any data transmission, control transmission or reference signal transmission to any node, e g UE or wireless device, or a desired signal, for example a data signal, that is to be transmitted from the transmission point and that can take the place of the interfering signal on at least some TFREs of the particular IMR where the signal that is independent of any data transmission, control transmission or reference signal transmission would otherwise be transmitted. The receiving node may be expected by the network to measure interference on the IMR. This expectation may be implicit, for example selecting an IMR where the receiving node is known to measure on interference or explicit, for example by instructing the receiving node to perform interference measurements on the IMR. The interfering signal that is independent of any data transmission, control transmission or reference signal transmission is independent in that it is not expected to be decoded or coherently measured upon by any node served by the transmitting node that controls the transmission point from which the interfering signal is transmitted. The desired signal is desired in that it is expected to be decoded or coherently measured upon by any nodes that may be configured to receive transmissions from the transmission point.

For the purpose of this disclosure an IMR is to be regarded in a wider context than currently adopted in 3GPP. For example, an IMR should be regarded only as a set of time frequency resource elements that a UE is expected, or will likely, estimate interference upon. For example, most implementations of Rel-8 to 10 LTE terminals measure interference on the TFREs associated with the cell specific reference signal (CRS), by first canceling the known CRS sequence. Hence, even though it is not mandated by the standard that a Rel 8-10 UE shall measure interference on the CRS resource elements, this is the de facto standard. Hence, in the following discussion also resource elements associated with a specific CRS configuration, i.e., a specific CRS shift and a specific number of CRS ports, are considered an IMR. Similarly, it should be understood that an IMR may also contain other desired signals intended for decoding or reference for a UE, in which case a UE is expected to cancel the impact of any such other desired signals, prior to performing the interference measurement. "Desired signal" in this context means a signal intended for reception by the receiving node, e g UE or wireless device. The interference measurement resource comprises a set of resource elements in which one or more signals assumed to be interfering with the desired signal are received. A reference signal resource comprises a set of resource elements in which one or more reference signals corresponding to a desired signal are received. In particular embodiments the reference signal resource is a CSI-RS resource. However, the reference signal (RS) resource may be any other type of RS resource which may be used to estimate a desired signal, e.g. a CRS resource.

To illustrate the teachings of this disclosure in more detail, some suggested embodiments will now be discussed in a coordinated transmission or CoMP scenario in a wireless communication system. However the reference to CoMP in the following discussion of this disclosure is not to be understood as limiting for the applicability of the teachings herein. The teachings herein are equally applicable in any wireless communication system when there is a need to reliably determine the interference that can be expected when receiving a signal over a communication channel from a radio access network.

CoMP transmission and reception refers to a system where the transmission and/or reception at multiple, geographically separated antenna sites is coordinated in order to improve system performance. More specifically, CoMP refers to coordination of antenna arrays that have different geographical coverage areas. The coordination between points can either be distributed, by means of direct communication between the different sites, or by means of a central coordinating node. A further coordination possibility is a "floating cluster" where each transmission point is connected to, and coordinates, a certain set of neighbors (e.g. two neighbors). A set of points that perform coordinated transmission and/or reception is referred to as a CoMP coordination cluster, a coordination cluster, or simply as a cluster in the following.

Figure 5:
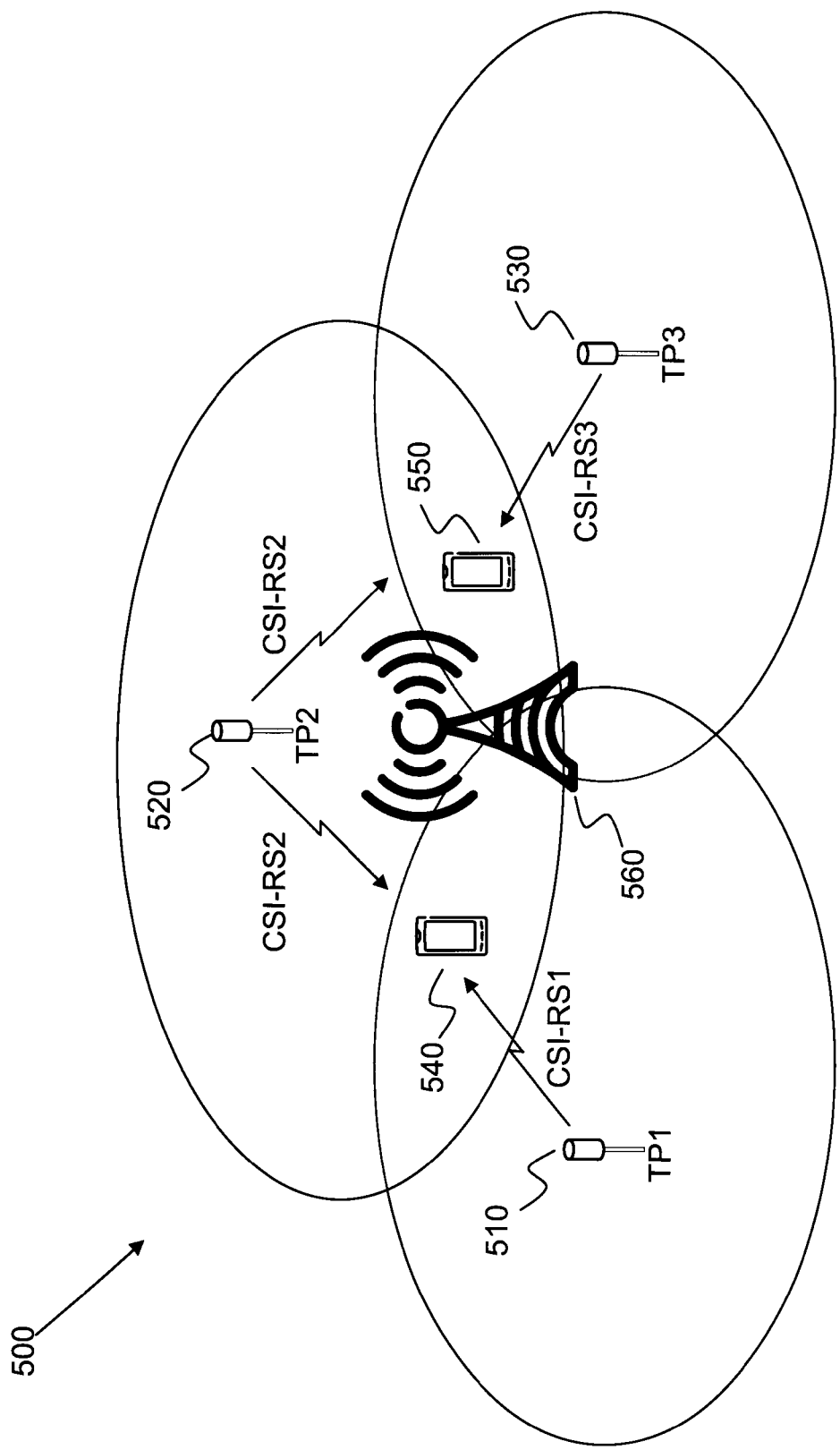
FIG. 5 is a schematic diagram illustrating a coordination cluster in a wireless network.
Figure 6:
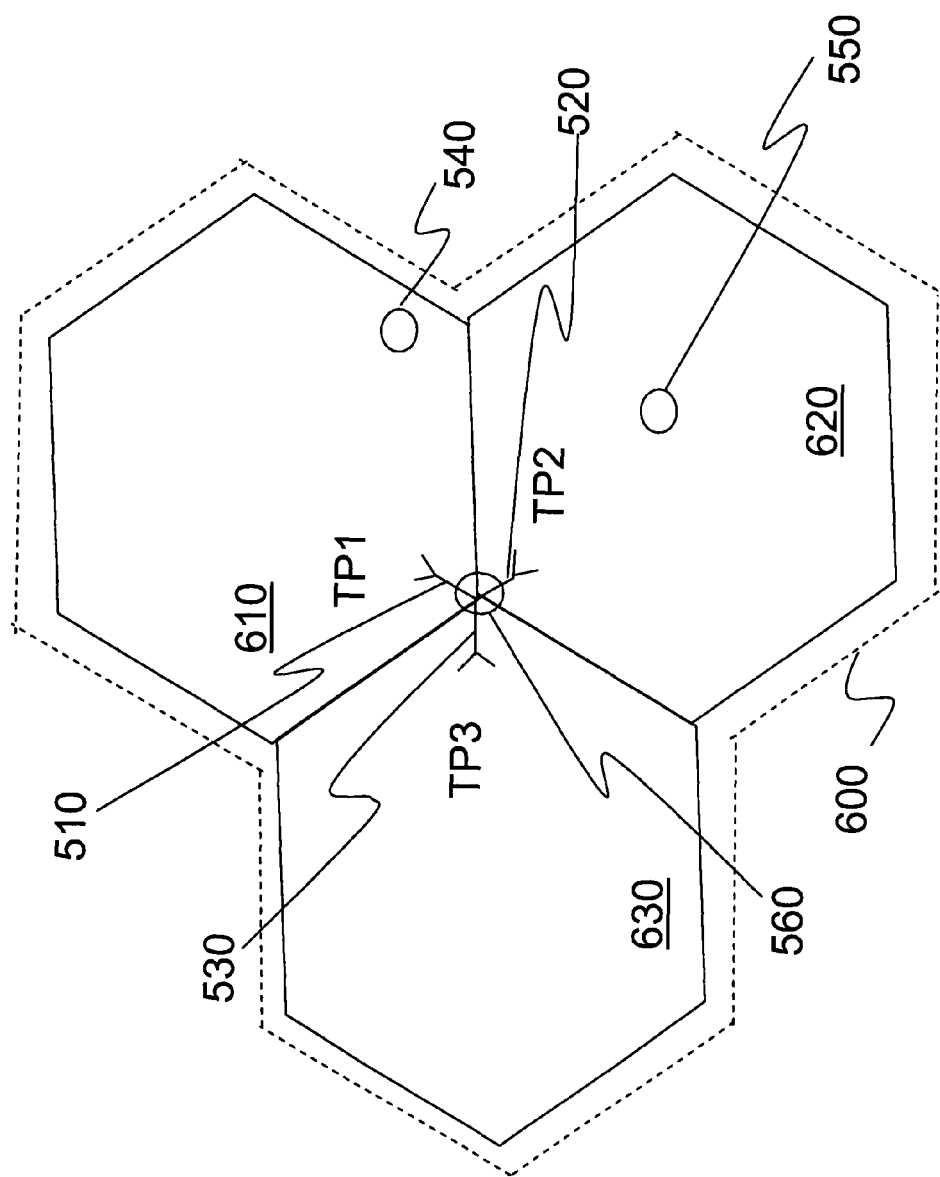
FIG. 6 is a schematic diagram illustrating a coordination cluster in a wireless network.
Figure 7:
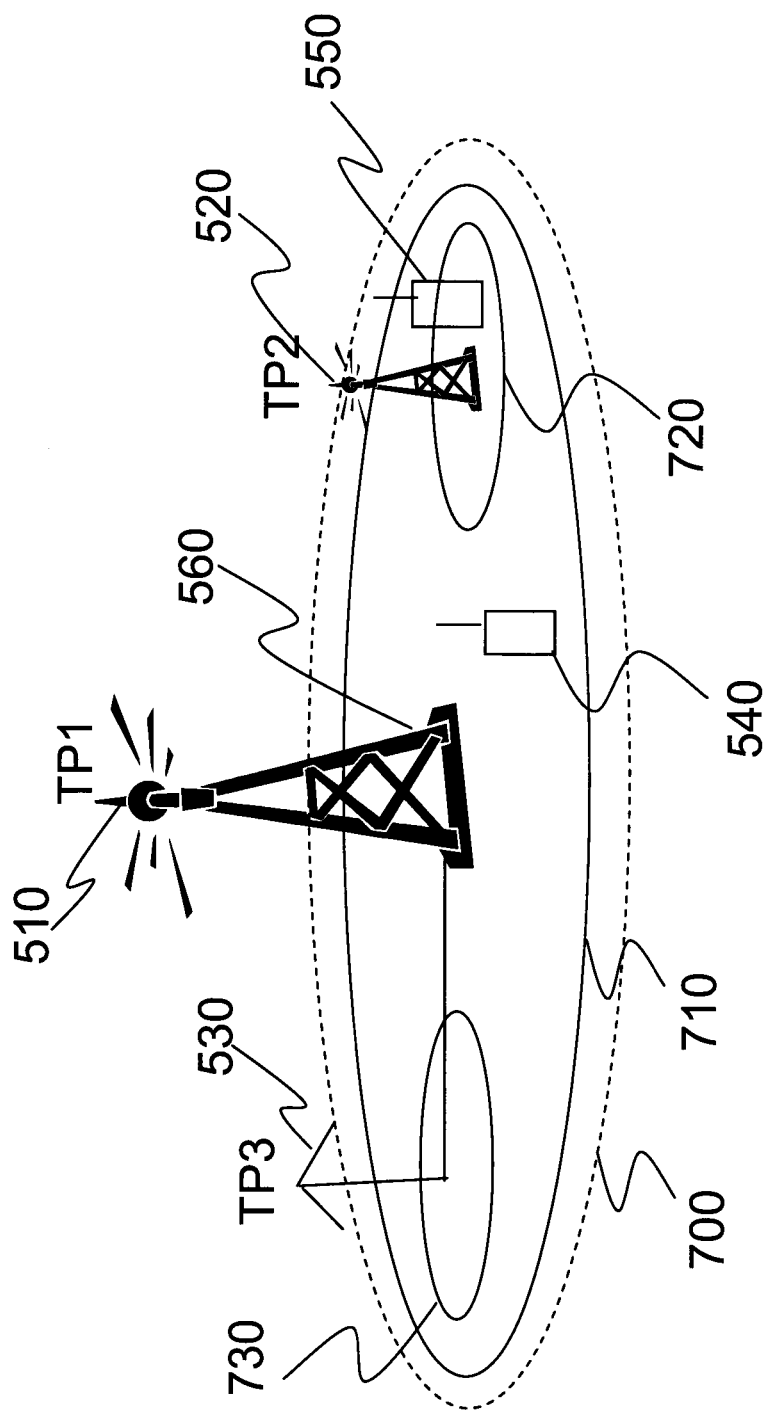
FIG. 7 is a schematic diagram illustrating a coordination cluster in a wireless network.

CoMP operation targets many different deployments, including coordination between sites and sectors in cellular macro deployments, as well as different configurations of Heterogeneous deployments, where for instance a macro node coordinates the transmission with pico nodes within the macro coverage area. In FIGS. 5-7 examples of wireless communications network deployments with CoMP coordination clusters comprising three transmission points, denoted TP1, TP2 and TP3 are shown.

There are many different CoMP transmission schemes that are considered; for example:

Dynamic Point Blanking where multiple transmission points coordinate the transmission so that neighboring transmission points may mute the transmissions on the time-frequency resources (TFREs) that are allocated to UEs that experience significant interference.

Coordinated Beamforming where the TPs coordinate the transmissions in the spatial domain by beamforming the transmission power in such a way that the interference to UEs served by neighboring TPs is suppressed.

Dynamic Point Selection (DPS) where the data transmission to a UE may switch dynamically (in time and frequency) between different transmission points, so that the transmission points are fully utilized.

Joint Transmission where the signal to a UE is simultaneously transmitted from multiple TPs on the same time/frequency resource. The aim of joint transmission is to increase the received signal power and/or reduce the received interference, if the cooperating TPs otherwise would serve some other UEs without taking the UE subject to Joint Transmission (JT) into consideration.

A common denominator for the CoMP transmission schemes is that the network needs CSI information not only for the serving TP, but also for the channels linking the neighboring TPs to a terminal or UE. By, for example, configuring a unique CSI-RS resource per TP, a UE can resolve the effective channels for each TP by measurements on the corresponding CSI-RS. Note that the UE is likely unaware of the physical presence of a particular TP, it is only configured to measure on a particular CSI-RS resource, without knowing of any association between the CSI-RS resource and a TP.

Several different types of CoMP feedback are possible. Most alternatives are based on per CSI-RS resource feedback, possibly with CQI aggregation of multiple CSI-RS resources, and also possibly with some sort of co-phasing information between CSI-RS resources. The following is a non-exhaustive list of relevant alternatives (note that a combination of any of these alternatives is also possible):

Per CSI-RS resource feedback corresponds to separate reporting of channel state information (CSI) for each of a set of CSI-RS resources. Such a CSI report may, for example, comprise one or more of a Precoder Matrix Indicator (PMI), Rank Indicator (RI), and/or Channel Quality Indicator (CQI), which represent a recommended configuration for a hypothetical downlink transmission over the same antennas used for the associated CSI-RS, or the RS used for the channel measurement. More generally, the recommended transmission should be mapped to physical antennas in the same way as the reference symbols used for the CSI channel measurement.

Typically there is a one-to-one mapping between a CSI-RS and a TP, in which case per CSI-RS resource feedback corresponds to per-TP feedback; that is, a separate PMI/RI/CQI is reported for each TP. Note that there could be interdependencies between the CSI reports; for example, they could be constrained to have the same RI. Interdependencies between CSI reports have many advantages, such as; reduced search space when the UE computes feedback, reduced feedback overhead, and in the case of reuse of RI there is a reduced need to perform rank override at the eNodeB.

The considered CSI-RS resources may be configured by the eNodeB as the CoMP Measurement Set. In the example shown in FIG. 5, different measurement sets may be configured for wireless devices 540 and 550. For example, the measurement set for wireless device 540 may consist of CSI-RS resources transmitted by TP1 510 and TP2 520, since these points may be suitable for transmission to device 540. The measurement set for wireless device 550 may instead be configured to consist of CSI-RS resources transmitted by TP2 520 and TP3 530. The wireless devices will report CSI information for the transmission points corresponding to their respective measurement sets, thereby enabling the network to e.g. select the most appropriate transmission point for each device.

Aggregate feedback corresponds to a CSI report for a channel that corresponds to an aggregation of multiple CSI-RS. For example, a joint PMI/RI/CQI can be recommended for a joint transmission over all antennas associated with the multiple CSI-RS.

A joint search may however be too computationally demanding for the UE, and a simplified form of aggregation is to evaluate an aggregate CQI which are combined with per CSI-RS resource PMIs, which should typically all be of the same rank corresponding to the aggregated CQI or CQIs. Such a scheme also has the advantage that the aggregated feedback may share much information with a per CSI-RS resource feedback. This is beneficial, because many CoMP transmission schemes require per CSI-RS resource feedback, and to enable eNodeB flexibility in dynamically selecting CoMP scheme, aggregated feedback would typically be transmitted in parallel with per CSI-RS resource feedback. To support coherent joint transmission, such per CSI-RS resource PMIs can be augmented with co-phasing information enabling the eNodeB to rotate the per CSI-RS resource PMIs so that the signals coherently combine at the receiver.

For efficient CoMP or coordinated transmission operation it is equally important to capture appropriate interference assumptions when determining the CQIs as it is to capture the appropriate received desired signal. Within a coordination cluster an eNodeB may to a large extent control which TPs that interfere a particular UE or wireless device in any particular TFRE. Hence, there will be multiple interference hypotheses depending on which TPs are transmitting data to other terminals, such as other UEs or wireless devices.

This means that, by controlling which TPs are transmitting data to other UEs or wireless devices, the network may control the interference seen by the particular UE or wireless device on an IMR. For example, by muting all TPs within a coordination cluster on the IMR, the the particular UE or wireless device will effectively measure the inter CoMP cluster interference. In the example shown in FIG. 5, this would correspond to muting TP1 510, TP2 520 and TP3 530 in the TFREs associated with the IMR. However, it is essential that an eNodeB can accurately evaluate the performance of a UE given different CoMP transmission hypotheses—otherwise the dynamic coordination becomes meaningless. Thus the system need to be able to track/estimate also different intra-cluster interference levels corresponding to different transmission and blanking hypotheses. It has therefore been proposed to allow configuration of multiple distinct IMRs, wherein the network is responsible for realizing different relevant intra-cluster and/or inter-cluster interference hypotheses in the different IMRs, e.g., by muting the data transmissions accordingly on different transmission points, and that a UE should be able to perform multiple interference measurements, corresponding to different intra-cluster interference hypotheses, by means of configuring multiple IMRs; thus enabling CSI or CQI reporting for the different interference hypotheses. Hence, by associating a particular reported CSI or CQI with a particular IMR the relevant CSIs or CQIs can be made available to the network for effective scheduling.

The network would thus be responsible for configuring the transmissions so that the interference measured on the different IMRs corresponds to the desired interference hypotheses; that is, for each IMR a set of transmission points will be muted, and intra-cluster interference only from the remaining coordinated (and un-coordinated) transmission points will be present on the IMR. In the state-of-the-art solutions, the data transmission on a specific transmission point will thus not be muted (or similarly muted) on the IMRs where interference from the transmission point should be present (or absent).

However, in LTE, muting is configured by means of zero power CSI-RS, which is configured UE specifically. Thus, muting is a UE specific property, rather than a transmission point specific property. This difference does not have any practical implications when the UE is allocated and served by a single transmission point. However, in systems operating e.g. with dynamic point selection (DPS) and/or joint transmission (JT), where the transmission to a specific UE involves, or changes between, multiple transmission points, there will be a mismatch between a configured muting pattern specific to the UE, and one of the potentially different targeted muting patterns of two different involved transmission points. In the state-of-the art solution, a UE, candidate for DPS/JT allocations, therefore would, typically, be configured to be muted on the union of the muting patterns for the two TPs. However, this will lead to an underestimation of the interference levels on the corresponding IMRs, since whenever the specific terminal is allocated the involved TPs will be muted also on IMRs where interference from the TP should be present.

Moreover, by realizing the different intra-cluster interference hypotheses by means of having an IMR excited by intra-cluster data transmissions the interference measurements will be impacted by the current traffic load in the system; that is, if there in a specific instance are no data for UEs that are candidates for transmissions from a particular TP, then there will be no data transmission that can collide with the IMR. Traditionally this is beneficial since the measured interference level will better reflect the typical, or expected, interference. However, when a coordinated cluster of transmission points are jointly (e.g., centrally) scheduled, the scheduler determines, and thus knows, the specific allocation on the coordinated transmission points—that is, the scheduler evaluates the two hypotheses where there is interference from a TP and when there is not. Hence, if the interference measurements including intra-cluster interference become biased by the load within the cluster, it will be more challenging for an eNodeB to accurately evaluate the performance of a UE for the hypothesis that there is interference present from a particular TP. This problem will be increasingly pronounced the lower traffic load there is within the cluster.

Similarly, if dynamic point blanking is applied, interference measurements will be affected by rapidly varying on-off behavior of transmission points that are dynamically blanked, i.e. muted, on certain subframes. Since the UE is unaware of potential blanking on neighboring transmission points it cannot choose to exclude interference measurements on these time-frequency resources. The corresponding CSI report will consequently not represent the desired interference hypothesis.

FIG. 5 illustrates an example wireless communications system 500 in which various embodiments of the invention may be implemented. The three transmission points 510, 520 and 530 form a CoMP coordination cluster. In the following, for purposes of illustration and not limitation, it will be assumed that the communications system 500 is an LTE system. Transmission points 510, 520 and 530 are remote radio units (RRU:s), controlled by eNodeB 560. In an alternative scenario (not shown), the transmission points could be controlled by separate eNodeBs. It should be appreciated that, generally speaking, each network node, e.g. eNodeB, may control one or more transmission points, which may either be physically co-located with the network node, or geographically distributed. In the scenario shown in FIG. 5, it is assumed that the transmission points 510, 520 and 530 are connected to eNodeB 560, e.g. by optical cable or a point-to-point microwave connection. In the case where some or all of the transmission points forming the cluster are controlled by different eNodeBs, those eNodeBs would be assumed to be connected with each other e.g. by means of a transport network, to be able to exchange information for possible coordination of transmission and reception.

Consider for example a dynamic point blanking scheme, where there are at least two relevant interference hypotheses for a particular UE: In one interference hypothesis the UE sees no interference from the coordinated neighboring transmission point; and in the other hypothesis the UE sees interference from the neighboring point. To enable the network to effectively determine whether or not a TP should be muted, the UE can report two, or generally multiple, CSIs or CQIs corresponding to the different interference hypotheses. Continuing the example of FIG. 5, assume that the wireless device 540 is configured to measure CSI from TP1 510. However, TP2 520 may potentially interfere with a transmission from TP1 510, depending on how the network schedules the transmission. Thus, the network may configure the device 540 for measuring the CSI-RS transmitted by TP1 for two interference hypotheses, the first one being that TP2 is silent, and the other one that TP2 is transmitting an interfering signal.

Figure 8A:
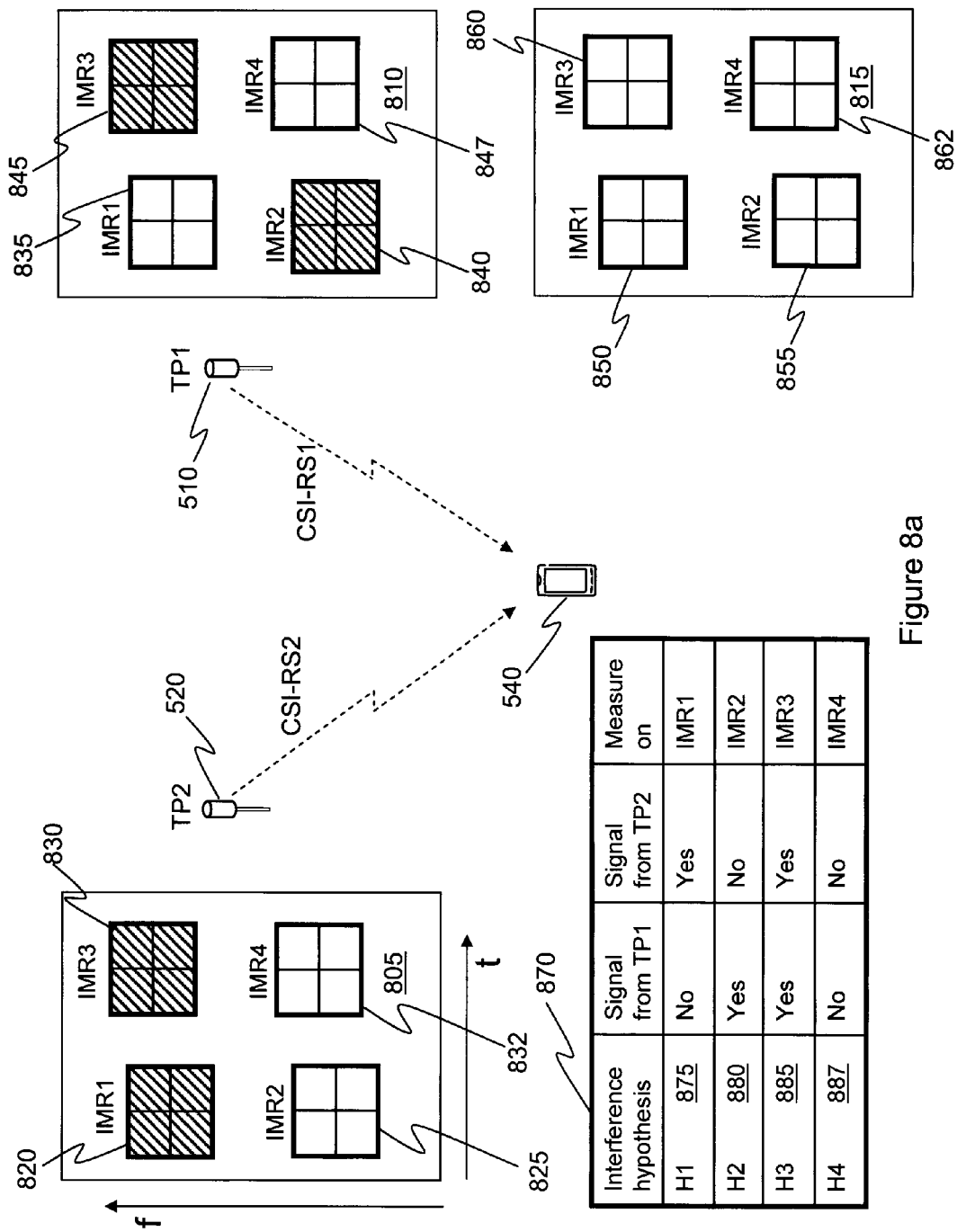
FIG. 8a is a schematic diagram illustrating a scenario in a coordination cluster in a wireless network.

This situation is further illustrated in the example of FIG. 8a. Therein, a UE or wireless device 540 has been configured with Interference Measurement Resources (IMRs) 815 comprising IMR1 850, IMR2 855, IMR3 860 and IMR4 862 by the network, e g in RRC signalling. Each IMR 850, 855, 860, 862 comprises at least one TFRE upon which the UE 540 is expected to perform measurements on interference. By configuring the corresponding resources in time t and frequency f 810 at transmission point TP1 510 and 805 at transmission point TP2 520 so that the transmission points TP1 510 and TP2 520 in various combinations transmit or does not transmit interfering signals on the different IMRs, the UE 540 is enabled to measure interference according to different interference hypotheses 875, 880, 885 and 887 as shown in table 870 in FIG. 8a. From table 870 it can be seen that TP1 510 has been configured by the network to transmit an interfering signal on IMR2 840 and IMR3 845, and that from TP1 510 no interfering signal is transmitted on IMR1 835 and IMR4 847. Further, it can be seen from table 870 that TP2 520 has been configured by the network to transmit an interfering signal on IMR1 820 and IMR3 830, and that from TP2 520 no interfering signal is transmitted on IMR2 825 and IMR4 832. In this example, the interfering signals are signals that are not expected to be decoded or coherently measured upon by the UE 540 or any other node served by the transmitting node that controls the transmission point from which the interfering signal is transmitted. Further, in the example in FIG. 8*a*, the measurements performed on IMR1, IMR2 and IMR3 correspond to different intra-cluster interference hypotheses H1 875, H2 880 and H3 885, whereas the measurements performed on IMR4 corresponds to inter-cluster interference hypothesis H4 887.

The interfering signal is not constrained by the configurations of specific UEs, but can be transmitted to match any interference composition of choice. For example, if all UEs within the cluster are configured to receive data transmissions that are muted on the union of the present IMRs, then there will be no data (or control) transmitted on any IMR. Thus, the interference measured on the IMRs may in the above example be unaffected by the intra-cluster data transmissions and the composition of the measured intra-cluster interference can be freely composed by the interfering signal(s).

In particular, an aspect is that interference from a particular transmission point (TP) is always present on all IMRs that the particular TP is expected to cause interference on. Otherwise the interference measurements on that IMR will not reflect the intended interference hypothesis. However, if the PDSCH of all UEs of a serving node are muted on all IMRs in a coordinated cluster this amounts to a significant overhead in the downlink.

Figure 8B:
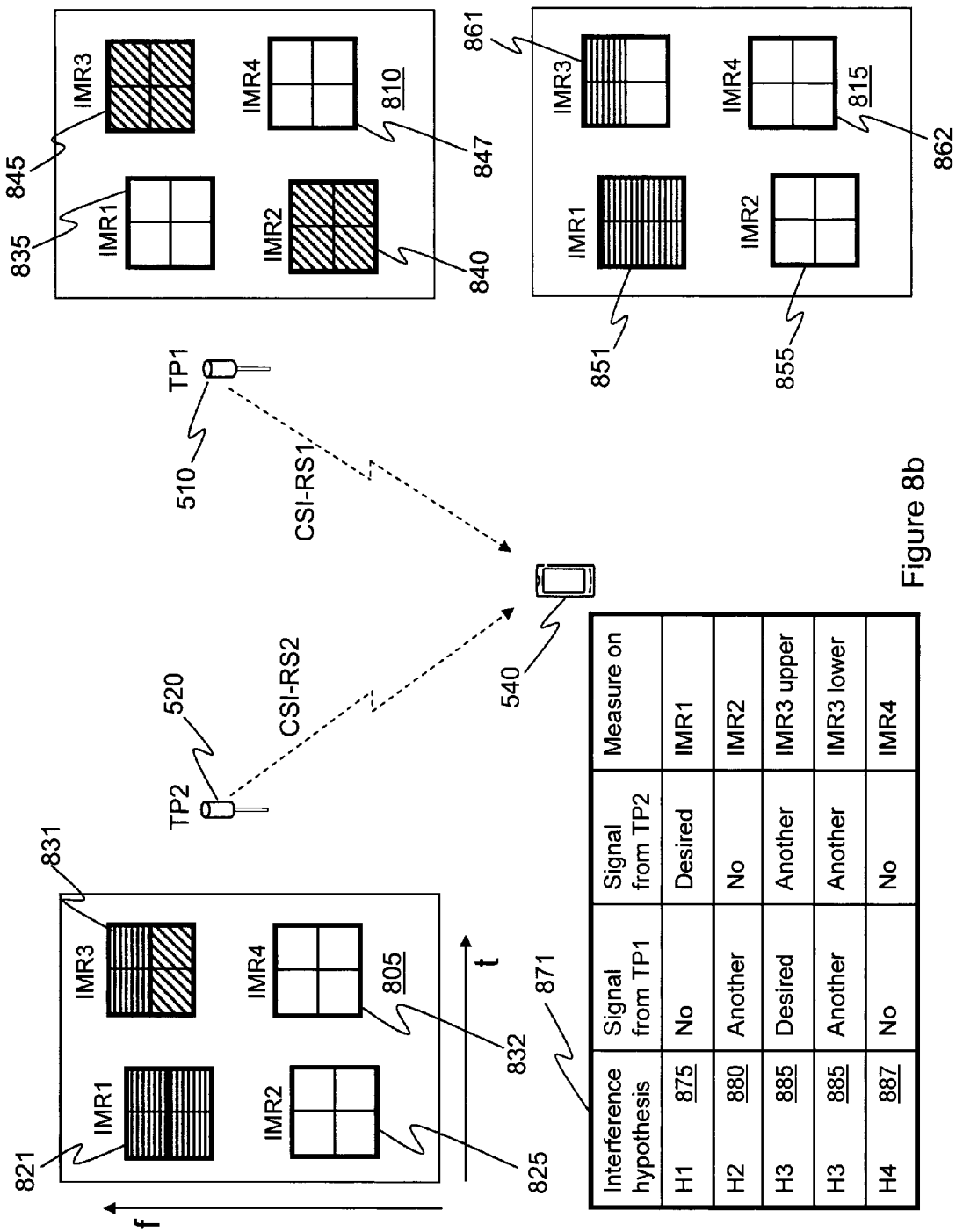
FIG. 8b is a schematic diagram illustrating a scenario in a wireless network.

The inventor has realized that in some situations it may be desired to increase the radio resources available for transmission of desired signals, such as data transmissions intended to be decoded by receiving nodes, or other desired signals intended to be coherently measured upon by receiving nodes, such as reference signals. FIG. 8*b* illustrates a scenario where the interfering signal transmitted on IMR1 821 is a desired signal that is expected to be decoded or coherently measured upon by the receiving node 540 or another node 550 served by the transmitting node 560. The receiving node has been correspondingly configured to expect that a desired signal may be sent on the TFREs of IMR1 851. This transmitted desired signal may further be used by receiving nodes in the wireless communication system, e g the receiving node 540 or the another node 550 for measuring interference according to interference hypothesis H1 875, as shown in table 871. As is further illustrated in FIG. 8*b*, the interfering signal transmitted on a first part of the TFREs of IMR3 831, as indicated by horizontal stripes in the upper part of IMR3 831, is also a desired signal that is expected to be decoded or coherently measured upon by the receiving node 540 or another node 550 served by the transmitting node 560. The receiving node has been correspondingly configured to expect that a desired signal may be sent on the TFREs of IMR3 861. This transmitted desired signal may further be used by receiving nodes in the wireless communication system, e g the receiving node 540 or the another node 550 for measuring interference according to interference hypothesis H3 885, as shown in table 871, by measuring on a first part of IMR3, indicated as IMR3 upper in table 871. Interference according to interference hypothesis H3 885 may also be measured on a second part of IMR3, indicated as IMR3 lower in table 871. On the TFREs of this part of IMR3 the interfering signal transmitted by TP2 is another signal that is not expected to be decoded or coherently measured upon by the receiving node 540 or any other node served by the transmitting node 560 that controls the transmission point from which the interfering signal is transmitted. As this signal is not expected to be decoded or coherently measured upon, the receiving node 540 is configured not to expect any desired signal to be sent on these TFREs, as indicated by lower part of IMR3 861 being blank. Thus, IMR3 upper and IMR3 lower provides signals for measurement according to the same Interference hypothesis. The difference is only that for IMR3 upper TP2 sends a desired signal and TP1 sends the another signal whereas for IMR3 lower TP1 and TP2 both send the another signal. A receiving node, e g a UE that may switch between TP2 and TP1 needs to measure different interference hypotheses. However, a receiving node such as a UE that is only connected to TP 2 all the time need not perform such measurements, and can then be configured to expect that a desired signal such as a PDSCH data transmission may come on all the IMRs where TP2 is configured to transmit, i e in this case on IMR1 851 and IMR3 861.

It should be noted that the illustrations given in FIGS. 8*a* and 8*b* are simplified to facilitate understanding. In practice, an IMR resource typically may comprise TFREs that are distributed over substantially the entire frequency bandwidth, for example with 4 TFREs in each resource block along the bandwidth. A data transmission to a receiving node is typically scheduled per resource block. When a desired signal, such as a data transmission, is transmitted on TFREs of an IMR as indicated in the example in FIG. 8*b*, the transmission typically overlaps the TFREs in the resource block where the data transmission occurs. In FIG. 8*b* only the TFREs where this overlap occurs are illustrated. According to this reasoning, IMR3 831 shows TFREs that belong two different resource blocks. Only the TFREs in the upper part of IMR3 belong to resource blocks where transmission of a desired signal occurs in such a way that the transmission overlaps the TFREs of the IMR3.

In short the illustrated embodiment of the invention involves dynamic alternation of a desired signal intended to be decoded or coherently measured upon by a receiving node such as a UE and another signal not intended to be decoded or coherently measured upon by any receiving node on an interference measurement resource (IMR) which the network intends to expose to a particular interference composition. Examples of desired signals may be data signals transmitted on the Physical Downlink Shared Channel (PDSCH). By letting the PDSCH from a particular TP be transmitted also in IMRs where interference should be present from the particular TP, the overhead of the PDSCH can be decreased, e g as compared to the case that only the above mentioned another signal is transmitted as interference signal on these particular IMRs, and by transmitting the another signal in the particular IMRs whenever/wherever a PDSCH is not present it is guaranteed that the correct interference composition is present on the particular IMR.

For UEs that are not candidates for transmissions involving other TPs than the serving TP it is sufficient to configure these UEs with a semi-static configuration of a muting pattern, e.g., a zero-power CSI-RS configuration, that covers the IMRs where the particular TP should be muted, whereas one or multiple IMRs where the TP should have interference present are not muted. Whenever the TP has a desired signal to transmit, such as a PDSCH transmission the data signal can take full use of all the resources also of the non-muted IMRs, and simultaneously cause the desired interference on this set of IMRs. However, when the TP does not have a desired signal such as a data signal (PDSCH) to transmit on resources defined by the IMRs that should have interference present, then a separate interference signal in form of the above mentioned another signal may be transmitted on those TFREs that are lacking the transmission of a desired signal. Thereby the TP can guarantee that interference is always present on a selected set of IMRs, but still utilize these IMRs for e g data transmissions when such are present.

In other words, by in this way enabling desired signals such as data transmissions to be scheduled so that they overlap TFREs of an IMR, the overhead incurred by enabling more reliable interference measurements according to different desired interference compositions through the use of IMRs may be substantially reduced in that more radio resources are made available for data transmission and other signaling intended to be decoded or coherently measured upon by receiving nodes in the wireless communication system. The embodiments of this disclosure achieve that the correct interference composition can be guaranteed to be present in an IMR while the PDSCH overhead is decreased, and thereby downlink throughput is increased The above technique can also be used for UEs engaged in dynamic point selection and/or joint transmission if the UE can be dynamically configured with a muting pattern, e.g. a ZP CSI-RS configuration, such that the muting pattern is always matched with the node/nodes from which the PDSCH transmission originates.

More generally, some embodiments provide a method in a transmitting node for enabling a receiving node to perform measurements on interference. The transmitting node enables the receiving node to perform measurements on interference by transmitting an interfering signal, as will now be described with reference to FIGS. 5-7 and the flowcharts of FIGS. 9a-9d. As a particular example, the transmitting node may be the transmitting node, e.g. eNodeB, 560 in FIG. 5 controlling TP1-TP3, which are transmission points or remote radio heads. In an alternative scenario, such as that shown in FIG. 6, the transmitting node may be a transmitting node or an eNodeB with three sector antennas which correspond to transmission points TP1-TP3, forming a CoMP cluster 600 wherein a receiving node 540 is located. In yet another scenario, as shown in FIG. 7, TP1-TP3 may form a CoMP cluster 700 wherein a receiving node 540 is located, and the transmitting node may either be the eNodeB controlling TP1 and TP3, or the eNodeB controlling TP2, and serving pico cell 720.

The interference is caused by transmissions from at least one transmission point 510, 520, 530 controlled by the transmitting node 560 on receptions at the receiving node 540. The transmitting and receiving nodes 560, 540 are comprised in a wireless communications system 500, 600, 700. The transmissions from different transmission points 510, 520, 530 may be coordinated in order to control interference and/or improve received signal quality in the wireless communications system 500, 600, 700. In some embodiments the wireless communications system may be configured to apply Coordinated Multipoint Transmission.

Figure 9B:
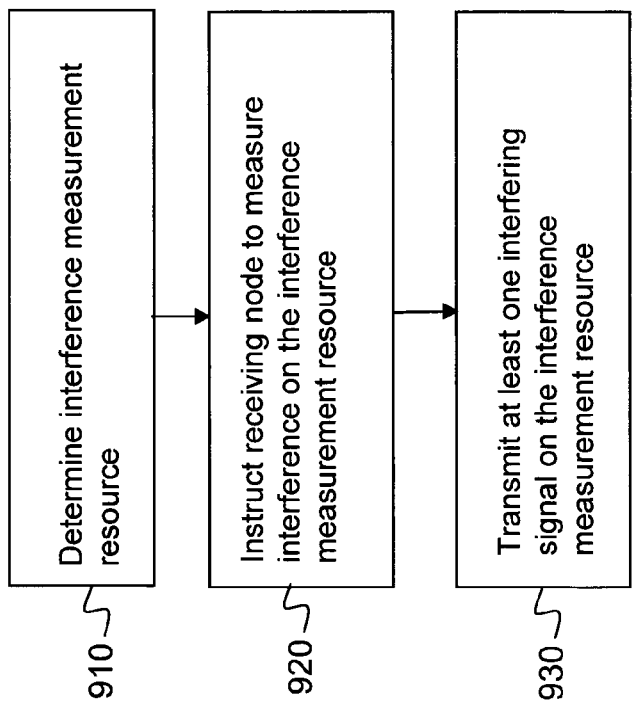
FIGS. 9a-9d are flow charts illustrating methods according to some embodiments.
Figure 9A:
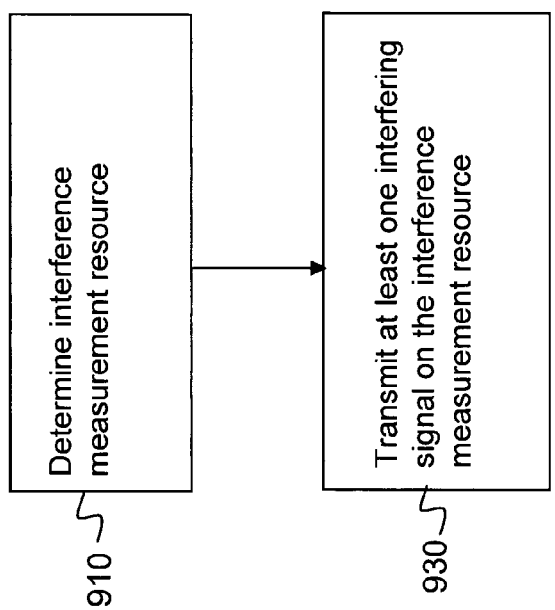

A first embodiment of the method is shown in FIG. 9a, wherein: In step 910 the transmitting node 560 determines an interference measurement resource, IMR. The IMR comprises a set of Time-Frequency Resource Elements, TFREs, upon which the transmitting node is expected to transmit interference. According to some embodiments, the IMR may comprise or be confined to TFREs upon which no signal that is expected to be decoded or coherently measured upon by any node 540, 550 served by the transmitting node 560 is pre-scribed to be transmitted. In other words according to these embodiments, a desired signal, that is expected to be decoded or coherently measured upon by at least one of the receiving nodes 540, 550 served by said transmitting node 560, is not pre-scribed, e g by the network or according to a standard, to be transmitted on the TFREs of the IMR. The receiving node 540 may in some embodiments be expected to measure interference on the IMR.

In step 930 the transmitting node 560 transmits, as said interference, at least one interfering signal on the IMR. The transmitted at least one interfering signal thereby causes the interference that the transmitting node 560 is expected to transmit on the IMR. The at least one interfering signal comprises at least one of a desired signal and another signal. The desired signal is expected to be decoded or coherently measured upon by the receiving node 540 or another node 550 served by said transmitting node 560. The desired signal may replace the another signal on one or more TFREs of the IMR when the desired signal is present. In other words, the desired signal may be transmitted in place of the another signal as said at least one interfering signal on one or more TFREs of the IMR when the desired signal is present at the at least one transmission point to be transmitted to the receiving node 540 or to the another node 550 served by said transmitting node 560. When the desired signal is not present at the at least one transmission point, or when no desired signal is present to be transmitted at the at least one transmission point, the another signal is transmitted by the at least one transmission point as said at least one interfering signal on the one or more TFREs of the IMR. The another signal is not expected to be decoded or coherently measured upon by any node 540, 550 served by the transmitting node 560. In some embodiments, the another signal is transmitted on TFREs of said IMR where the desired signal is not transmitted. Alternatively or additionally, the another signal may be transmitted on TFREs of said IMR where no desired signal is transmitted. The another signal is muted on TFRE's of said IMR where the desired signal is transmitted.

In an alternative, in step 910 the transmitting node 560 determines an interference measurement resource, IMR. The IMR comprises set of Time-Frequency Resource Elements, TFREs, upon which the transmitting node is expected to transmit interference. No signal that is expected to be decoded or coherently measured upon by any node 540, 550 served by the transmitting node 560 is pre-scribed to be transmitted on the TFREs. In other words, a desired signal, that is expected to be decoded or coherently measured upon by at least one of the receiving nodes 540, 550 served by said transmitting node 560, is not pre-scribed, e g by the network or according to a standard, to be transmitted on the TFREs of the IMR. The receiving node 540 may in some embodiments be expected to measure interference on the IMR.

According to the alternative, in step 930 the transmitting node 560 transmits at least one interfering signal on the IMR. The at least one interfering signal comprises at least one of a desired signal and another signal. The desired signal is expected to be decoded or coherently measured upon by the receiving node 540 or another node 550 served by said transmitting node 560. The another signal is not expected to be decoded or coherently measured upon by any node 540, 550 served by the transmitting node 560. In some embodiments, the another signal is transmitted on TFREs of said IMR where the desired signal is not transmitted. Alternatively or additionally, the another signal may be transmitted on TFREs of said IMR where no desired signal is transmitted. The another signal is muted on TFRE's of said IMR where the desired signal is transmitted.

The transmitting node 560 may in at least some embodiments be configured to select, momentarily for a subframe to be transmitted, whether to transmit the desired signal or the another signal on the one or more TFREs of the IMR.

The desired signal may in at least some embodiments be a signal that is expected to be decoded by the receiving node 540 or another node 550 served by said transmitting node 560. In one example according to such embodiments, the desired signal is a data signal transmitted on the Physical Downlink Shared Channel.

In some embodiments, the at least one transmission point 510, 520, 530 may comprise a composition of transmission points. The transmission of at least one interfering signal in step 930 may then comprise transmitting a respective interfering signal on the IMR from each transmission point in the composition of transmission points. The composition of transmission points may be selected so that it enables the receiving node 540 to measure interference applicable to at least one transmission hypothesis for which the receiving node 540 is to report Channel State Information, CSI, to the transmitting node 560. The selection of composition of transmission points may be made by the transmitting node 560. Alternatively in some embodiments, the selection may be made by a controlling node that coordinates transmissions from the at least one transmission point 510, 520, 530 with transmissions from at least one further transmission point controlled by a further transmitting node in the wireless communication system 500, 600, 700.

FIG. 9b depicts an embodiment wherein the transmitting node 560 in addition to performing steps 910 and 930 as above instructs the receiving node 540, in a step 920, to measure interference on said IMR. Alternatively or additionally, the receiving node may be arranged to measure interference on said IMR without being explicitly instructed to do so by the transmitting node. In one particular embodiment, the receiving node may be pre-configured to measure interference on said IMR.

Figures 9C, 9D:
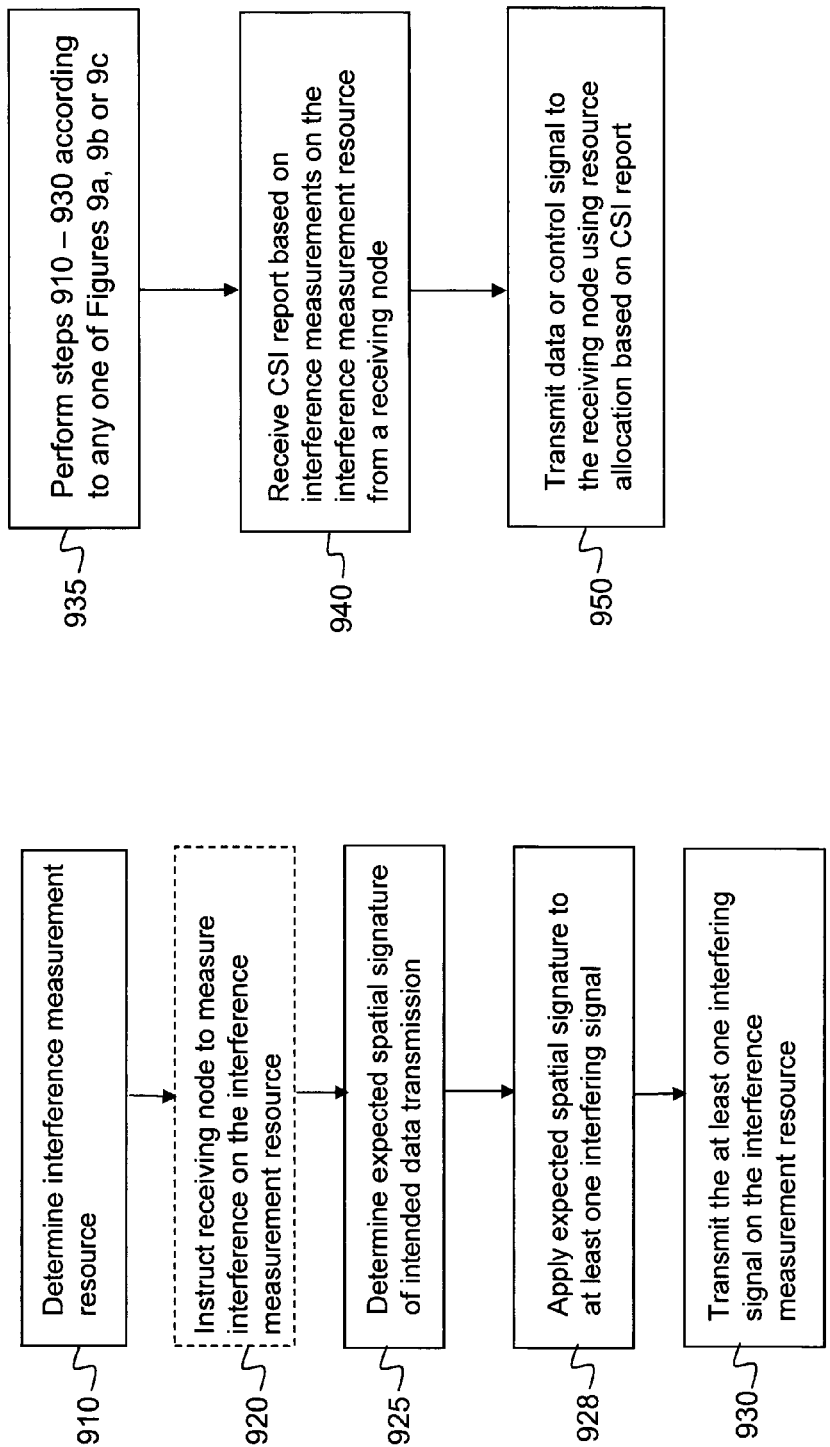

FIG. 9c depicts an embodiment wherein the transmitting node 560 in addition to performing steps according to any of the embodiments of FIG. 9a or 9b determines, in a step 925, an expected spatial signature of an intended data transmission to the receiving node 540 and, in a step 928, applies said expected spatial signature when transmitting said at least one interfering signal. The expected spatial signature may in some embodiments be determined based on respective buffer status and historic CSI reports of the receiving node 540 and at least one further receiving node 550 served by the transmitting node 560.

FIG. 9d shows an embodiment where the interference measurements performed according to any of the embodiments of FIG. 9a, 9b or 9c are used for link adaptation of a communication link between the transmitting node 560 and the receiving node 540. The link adaptation is performed as follows:

In step 940 the transmitting node 560 receives a Channel State Information, CSI, report from the receiving node 540. The CSI report is based at least in part on interference measurements performed by the receiving node 540 on the IMR.

In step 950 the transmitting node 560 transmits a data or control signal to the receiving node 540 using a resource allocation and/or link adaptation that is based, at least in part, on the CSI report.

The IMR may in any one of the embodiments presented above be configured to coincide with Time-Frequency Resource Elements, TFREs, of a Cell Specific Reference Signal, CRS, configuration. In some of these embodiments, no CRS is transmitted from the at least one transmission point 520, 530 on the TFREs of the CRS configuration. In these embodiments, CRS may transmitted from a neighbouring transmission point 510 on the TFREs of the CRS configuration and transmissions from the at least one transmission point 520, 530 may be coordinated with transmissions from the neighbouring transmission point 510. In some embodiments Coordinated Multipoint Transmission may ve applied to coordinate the transmissions.

Alternatively or additionally, the IMR may in any one of the embodiments presented above be configured to be covered by, overlap with or coincide with Time-Frequency Resource Elements, TFREs, of a Channel State Information-Reference Signal, CSI-RS, configuration applied for the receiving node 540. The impact of the CSI-RS may then need to be cancelled out by the receiving node 540 when performing the interference measurement.

Alternatively or additionally, the IMR may in any one of the embodiments presented above be configured to be covered by, overlap with or coincide with Time-Frequency Resource Elements, TFREs, of a zero power Channel State Information-Reference Signal, CSI-RS, configuration applied for the receiving node 540.

Furthermore, in any one of the embodiments presented above, a further desired signal expected to be decoded or coherently measured upon by any of the nodes 540, 550 served by the transmitting node 560 may be transmitted on at least one Time-Frequency Resource Element, TFRE, that is covered by, covers, overlaps with or coincides with the IMR, in addition to the transmitted at least one interfering signal. The impact of the further desired signal may then need to be cancelled out by the receiving node 540 when performing the interference measurement.

Furthermore, in any one of the embodiments presented above, the transmitted at least one interfering signal may be an isotropic signal.

Furthermore, in any one of the embodiments presented above, the IMR determined in step 910 may be a subset of a set of TFREs upon which said receiving node 540 is configured not to expect data transmissions from any one of said at least one transmission point 510, 520, 530. In some of these embodiments, the set of TFREs may be a set of zero power Channel State Information-Reference Signal, CSI-RS, configurations.

Figure 10A:
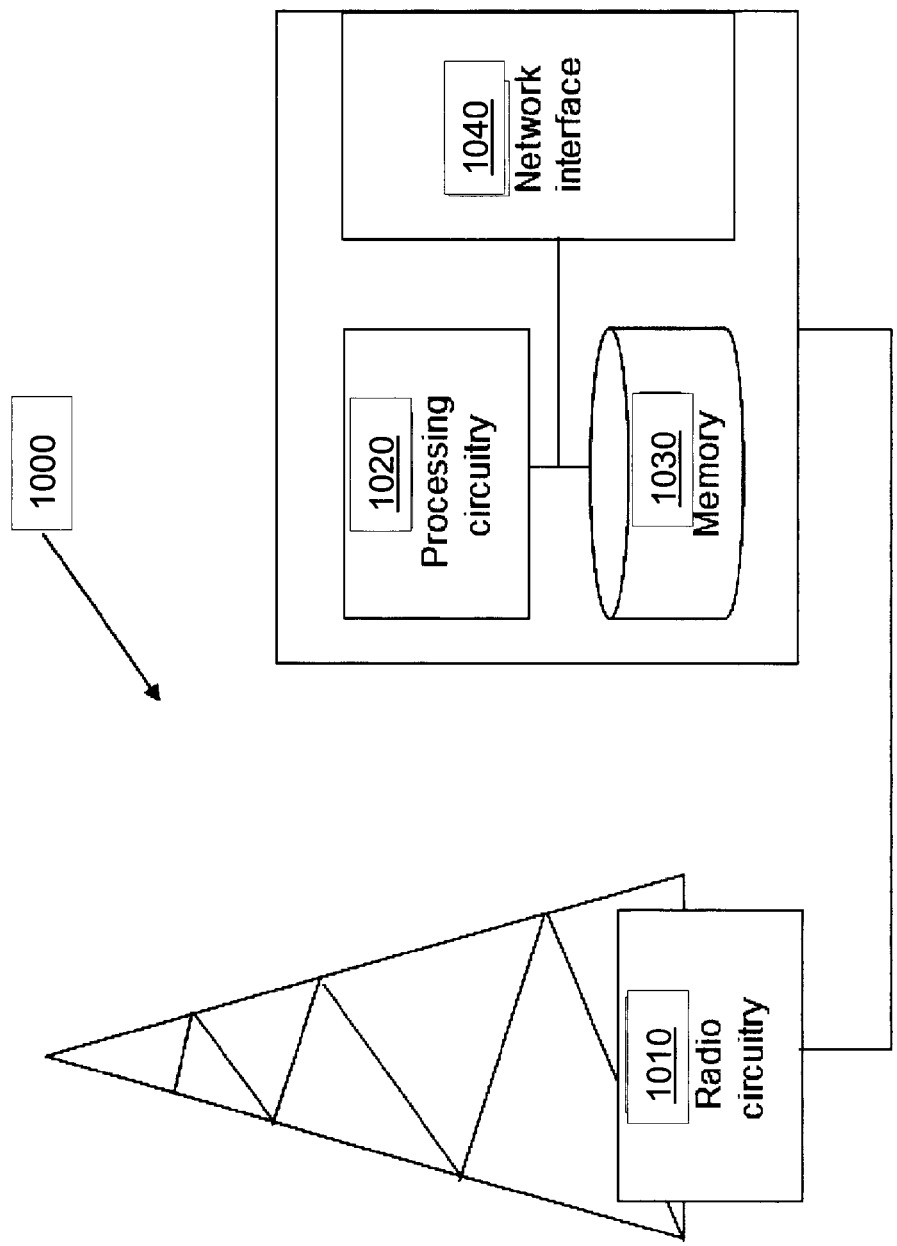
FIG. 10a is a block diagram illustrating a network node according to some embodiments.
Figure 10B:
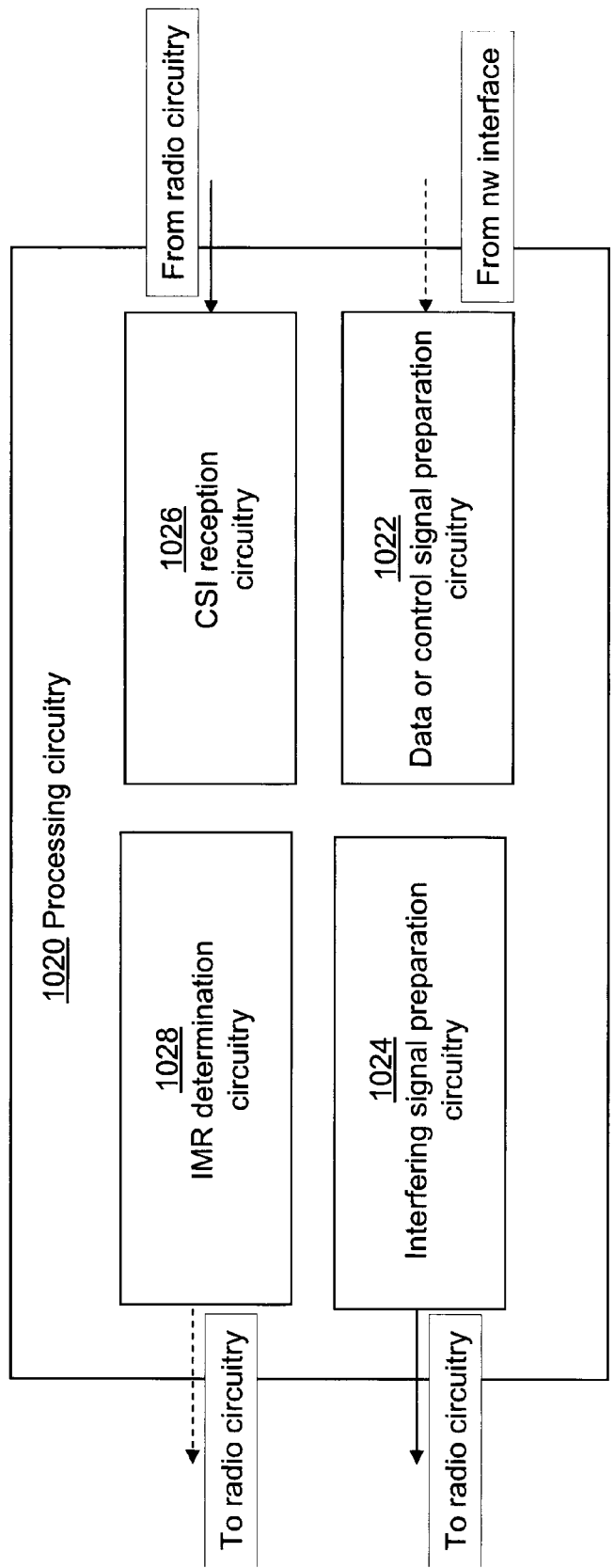
FIG. 10b is a block diagram illustrating details of a network node according to some embodiments.

FIGS. 10a-b illustrate devices configured to execute the methods described above in relation to FIG. 9a-d.

FIG. 10a illustrates a transmitting node 560, 1000 for enabling a receiving node 540 to perform measurements on interference. The transmitting node 560, 1000 enables the receiving node to perform measurements on interference by transmitting an interfering signal. The transmitting node 560, 1000 is configured to be connectable to radio circuitry 1010 comprised in at least one transmission point 510, 520, 530 for communicating with the receiving node 540 in the wireless communications system 500, 600, 700. Receptions at the receiving node 540 may be susceptible to interference caused by transmissions from the at least one transmission point 510, 520, 530.

The transmitting node 560, 1000 comprises processing circuitry 1020. The processing circuitry 1020 is configured to determine an interference measurement resource, IMR. The IMR comprises set of Time-Frequency Resource Elements, TFREs, upon which the transmitting node is expected to transmit interference. The receiving node 540 may in some embodiments be expected to measure interference on the IMR. The processing circuitry 1020 is further configured to transmit as said interference, via the at least one transmission point 510, 520, 530, at least one interfering signal on said IMR. The transmitted at least one interfering signal thereby causes the interference that the transmitting node 560, 1000 is expected to transmit on the IMR. The at least one interfering signal comprises at least one of a desired signal and another signal. The desired signal is expected to be decoded or coherently measured upon by the receiving node 540 or another node 550 served by said transmitting node 560, 1000. The transmitting node 560, 1000 may be configured to replace the another signal by the desired signal on one or more TFREs of the IMR when the desired signal is present. In other words, the transmitting node 560, 1000 may be configured to transmit the desired signal in place of the another signal as said at least one interfering signal on one or more TFREs of the IMR when the desired signal is present at the at least one transmission point 510, 520, 530 to be transmitted to the receiving node 540 or to the another node 550 served by said transmitting node 560. When the desired signal is not present at the at least one transmission point 510, 520, 530, or when no desired signal is present to be transmitted at the at least one transmission point 510, 520, 530, the another signal is transmitted by the at least one transmission point as said at least one interfering signal on the one or more TFREs of the IMR. The another signal is not expected to be decoded or coherently measured upon by any node 540, 550 served by said transmitting node 560, 1000. In some embodiments, the processing circuitry 1020 is configured to transmit the another signal on TFREs of said IMR where the desired signal is not transmitted. Alternatively or additionally, the processing circuitry 1020 may be configured to transmit the another signal on TFREs of said IMR where no desired signal is transmitted. The processing circuitry 1020 is configured to mute the another signal on TFRE's of said IMR where the desired signal is transmitted.

In an alternative, no signal that is expected to be decoded or coherently measured upon by any node 540, 550 served by the transmitting node 560, 1000 is pre-scribed to be transmitted on the TFREs of the IMR. In other words, a desired signal, that is expected to be decoded or coherently measured upon by at least one of the receiving nodes 540, 550 served by said transmitting node 560, is according to the alternative, not pre-scribed, e g by the network or according to a standard, to be transmitted on the TFREs of the IMR.

The transmitting node 560, 1000 may in at least some embodiments be configured to select, momentarily for a subframe to be transmitted, whether to transmit the desired signal or the another signal on one or more TFREs of the IMR.

The desired signal may in at least some embodiments be a signal that is expected to be decoded by the receiving node 540 or another node 550 served by said transmitting node 560. In one example according to such embodiments, the desired signal is a data signal transmitted on the Physical Downlink Shared Channel.

The processing circuitry 1020 may in some embodiments further be configured to receive, via the at least one transmission point 510, 520, 530, a Channel State Information, CSI, report from the receiving node 540. The CSI report may be based at least in part on interference measurements performed by the receiving node 540 on said IMR. Further, the processing circuitry 1020 may be configured to transmit, via the at least one transmission point 510, 520, 530, a data or control signal to said receiving node 540 using a resource allocation and/or link adaptation that is based, at least in part, on said CSI report.

The processing circuitry 1020 may in further embodiments further be configured to instruct, via the at least one transmission point 510, 520, 530, the receiving node 540 to measure interference on said IMR.

FIG. 10b illustrates details of a possible implementation of processing circuitry 1020.

Figure 11A:
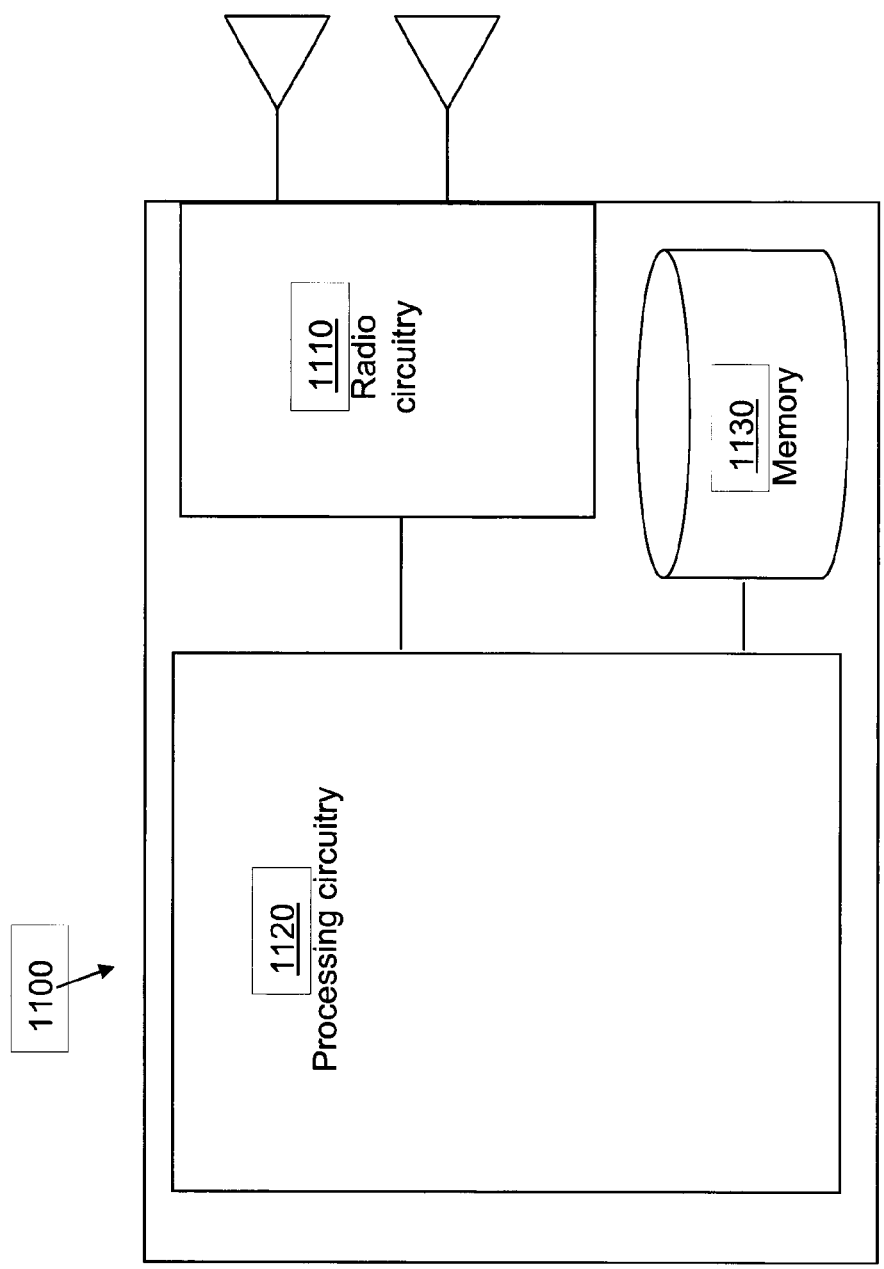
FIG. 11a is a block diagram illustrating a wireless device according to some embodiments.

FIG. 11a shows a receiving node 1100 that may perform measurements on interference as enabled by the method performed in the transmitting node 1000.

Figure 11B:
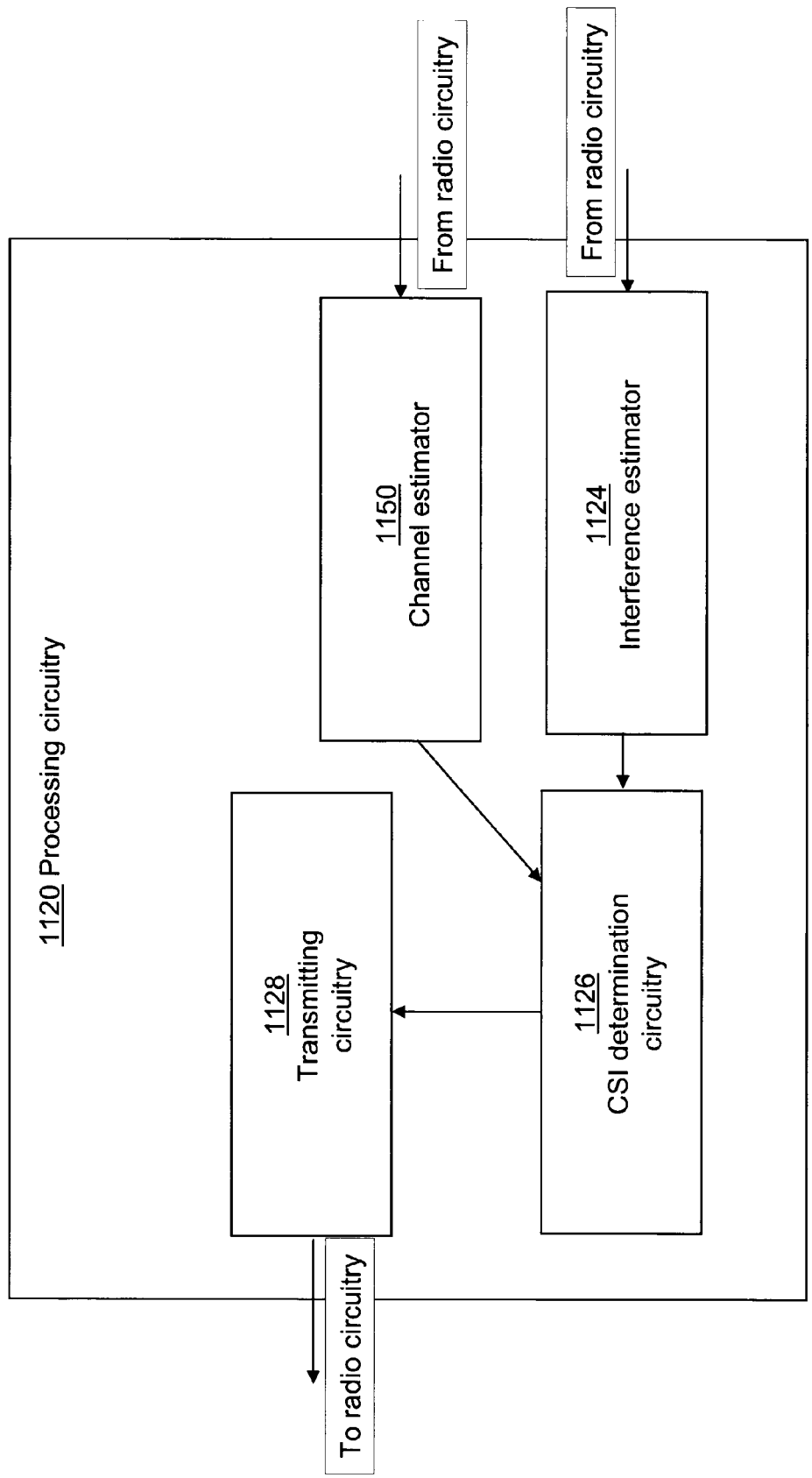
FIG. 11b is a block diagram illustrating details of a wireless device according to some embodiments.

FIG. 11b illustrates details of a possible implementation of processing circuitry 1120 of the receiving node 1100.

In some embodiments, the method performed in an eNodeB involves
1) Determining for a first UE an interference measurement resource for a specific interference measurement.
2) Transmitting at least one interfering signal, over an effective channel, on time/frequency resource elements associated with said specific interference measurement resource, wherein said interfering signal is independent of data/control signalling
3) Receiving from said first UE a CSI report (that is expected to be) based, at least in part, on interference measurements on said specific interference measurement resource
4) Transmitting a data or control signal, whose resource allocation and/or corresponding link adaptation is based, at least in part, on said CSI report.

Here, an effective channel includes the radio propagation channel as well as receive and transmit antenna gains. Moreover, an effective channel may involve multiple receive and/or transmit antennas, and can further include any virtualization of the antennas (i.e., linear transformations of signals to be transmitted on multiple transmit antennas). Hence a special case of step 2) above is to transmit the specific interfering signal from all antennas of a specific transmission point. Potentially, also a second interfering signal (on the same IMR) may be transmitted also from the antennas of a second transmission point, and so on.

A special embodiment, where the IMR is interpreted as a CRS resource, is in a heterogeneous deployment where at least one pico node shares the same cell ID as a macro node whose coverage area at least partially overlaps with the pico node's coverage area. With this particular deployment, the pico nodes and the macro will share the same CRS resource element positions (in fact also the same CRS sequence will be shared). Hence, with this configuration, the data transmissions is always rate matched around (e.g., muted) the TFREs associated with the CRS, and thus the UEs served by the shared cell will not measure any interference from the nodes sharing the cell ID (presuming that they perform the interference measurement on the CRS positions). Hence by actively transmitting an interfering signal from at least one of the transmission points (e.g., one of the pico nodes) on the CRS TFREs a Rel 8-10 LTE terminal will report CSI corresponding to present interference from said at least one transmission points. This is particularly interesting if the CRS is only transmitted from the macro node, whereas the pico nodes mute the CRS, and act purely as performance boosters for Rel-11 and beyond terminals, using transmission modes not relying on CRS. Hence, Release 8-10 terminals that connect to the macro will, due to the interfering signals transmitted from the pico nodes on the CRS positions, still measure relevant interference.

In a another embodiment the Determining in step 1) comprises configuring, for example by means of radio resource control messages, said first UE to perform said specific interference measurement on an interference measurement resource selected by the eNodeB.

This will be the typical implementation for LTE Rel 11 terminals and beyond, where the IMR will be configurable.

In a further embodiment, the eNodeB configures also a second UE for data receptions that are muted on said specific interference measurement resource.

This embodiment reflects that by configuring muting for all terminals on one, or the union of multiple, IMR(s) then the network can take full control of the interference seen on the IMR(s) independently of the scheduling and the data transmissions.

In one embodiment, said interfering signal is an isotropic signal. In this context an isotropic signal refers to a signal that excites all dimensions of an effective channel.

By transmitting an isotropic interference signal (i.e., a spatially white, uncorrelated) signal no special bias to any spatial direction is imposed on the interference signal, which prevents the UE from making particular interference suppression assumptions of low rank interference in the CSI reporting (e.g., in the interference suppression algorithms).

In another embodiment, the eNodeB further determines an expected spatial signature of a subsequent data transmission, and applies said expected spatial signature on said interfering signal.

Such a spatial signature could be wideband or frequency selective. If the eNodeB can predict the spatial characteristics (e.g., typical beamforming or precoding directions) for subsequent data transmissions, it is beneficial to impose the same characteristics on the interfering signal, since this will allow a UE to better predict the actual interference suppression performance in the CSI reporting, and thus enable more accurate link adaptation in the eNodeB.

In one such embodiment, the eNodeB determines said expected spatial signature based on the buffer statuses of connected UEs and historic CSI reports from said connected UEs.

In a second such embodiment, the eNodeB excludes the non-primary (e.g. the non-strongest) transmission points participating in a joint transmission to a UE from the spatial signature.

This embodiment ensures that the transmit signal from a non-serving transmission point participating in a joint transmission is not accounted for as interference in the subsequent CSI report from the targeted UE.

In another embodiment, said interfering signal is constructed to have the same spatial signature as a current (or past) data and/or control transmission.

In one such embodiment, the interfering signal is muted on associated resource elements in RBs where there is no current data assignments to be transmitted over said effective channel.

This will effectively cause the UE to measure an interference corresponding to a data transmission, but without the restrictions of collisions with regular data.

Such embodiments can be beneficial when the scheduling of different transmission points are only partially coordinated; for example, when specific resource blocks (in time and/or frequency) are prioritized for transmissions from a specific node (but may be used by other nodes when the resource need is sufficiently high). In such limited coordination scenarios, there can typically not be a joint (central) scheduler that benefits from having on/off kind of interference estimates. Instead, it is typically more beneficial to let the interference measurement be biased by the current load in the system. For example, one IMR could be configured to capture the interference from data corresponding to prioritized resource blocks, and another IMR could be configured to capture the interference corresponding to the data interference on non-prioritized RB.

In another embodiment, said interfering signal is constructed to have the spatial signature that is a linear combination of the spatial signatures of current and past data and/or control transmission.

In one such embodiment, the interfering signal is muted on associated resource elements in RBs where there is no current data assignments to be transmitted over said effective channel.

The invention provides a solution to freely construct the interference composition on an IMR without any limitations imposed by UE specific muting configurations. Moreover, the interference measurements can be made to better reflect the performance when there is actual intra-cluster interference present without bias imposed by varying traffic load in the system.

This will translate to improved link adaptation and spectral efficiency in the wireless system.

When using the word "comprise" or "comprising" it shall be interpreted as non-limiting, i.e. meaning "consist at least of".

The present invention is not limited to the above described preferred embodiments. Various alternatives, modifications and equivalents may be used.

The invention claimed is:

1. A method in a transmitting node for enabling a receiving node to perform measurements on interference caused by transmissions from at least one transmission point controlled by the transmitting node on receptions at the receiving node, the transmitting and receiving nodes being comprised in a wireless communications system, the method CHARACTERIZED IN comprising:
   determining an interference measurement resource, IMR, comprising a set of Time-Frequency Resource Elements, TFREs, upon which the transmitting node is expected to transmit interference; and
   transmitting at least one interfering signal on said IMR as said interference, wherein the at least one interfering signal comprises of a desired signal, that is expected to be decoded or coherently measured upon by the receiving node or another node served by said transmitting node, and another signal, that is not expected to be decoded or coherently measured upon by any node served by said transmitting node, wherein the desired signal is transmitted in place of the another signal as said at least one interfering signal on one or more TFREs of the IMR when the at least one transmission point is to transmit the desired signal to the receiving node or to the another node served by said transmitting node and wherein the another signal is transmitted on TFREs of said IMR where no desired signal is transmitted and wherein the another signal is muted on TFRE's of said IMR where the desired signal is transmitted.

2. The method of claim 1, further comprising selecting, for a subframe to be transmitted, whether to transmit the desired signal or the another signal on the one or more TFREs of the IMR.

3. The method of claim 1, wherein the desired signal is expected to be decoded by the receiving node or another node served by said transmitting node.

4. The method of claim 1, wherein the desired signal is a data signal transmitted on the Physical Downlink Shared Channel.

5. The method of claim 1, wherein transmissions from different transmission points are coordinated in order to control interference and/or improve received signal quality in the wireless communications system.

6. The method of claim 1, wherein the interference measurements are used for link adaptation of a communication link between the transmitting node and the receiving node, the method comprising the further steps of:

receiving a Channel State Information, CSI, report from the receiving node, wherein the CSI report is based at least in part on interference measurements performed by the receiving node on said IMR;
transmitting a data or control signal to said receiving node using a resource allocation and/or link adaptation that is based, at least in part, on said CSI report.

7. The method of claim 1, comprising the further step of: instructing the receiving node to measure interference on said IMR.

8. The method of claim 1, wherein the at least one transmission point comprises a composition of transmission points and wherein transmitting the at least one interfering signal comprises transmitting a respective interfering signal on said IMR from each transmission point in said composition of transmission points.

9. The method of claim 8, wherein said composition of transmission points is selected so that it enables the receiving node to measure interference applicable to at least one transmission hypothesis for which the receiving node is to report Channel State Information, CSI, to the transmitting node.

10. The method of claim 8, wherein said composition of transmission points is selected by the transmitting node.

11. The method of claim 8, wherein said composition of transmission points is selected by a controlling node that coordinates transmissions from the at least one transmission point with transmissions from at least one further transmission point controlled by a further transmitting node in said wireless communication system.

12. The method of claim 1, wherein the IMR coincides with Time-Frequency Resource Elements, TFREs, of a Cell Specific Reference Signal, CRS, configuration.

13. The method of claim 12, wherein no CRS is transmitted from the at least one transmission point on the TFREs of the CRS configuration.

14. The method of claim 13, wherein CRS is transmitted from a neighbouring transmission point on the TFREs of the CRS configuration and wherein transmissions from the at least one transmission point are coordinated with transmissions from the neighbouring transmission point.

15. The method of claim 1, wherein the IMR is covered by Time-Frequency Resource Elements, TFREs, of a Channel State Information-Reference Signal, CSI-RS, configuration applied for the receiving node, and wherein the impact of the CSI-RS is to be cancelled out by the receiving node when performing the interference measurement.

16. The method of claim 1, wherein the IMR is covered by Time-Frequency Resource Elements, TFREs, of a zero power Channel State Information-Reference Signal, CSI-RS, configuration applied for the receiving node.

17. The method of claim 1, wherein a further desired signal expected to be decoded or coherently measured upon by any of the nodes served by said transmitting node is transmitted on at least one Time-Frequency Resource Element, TFRE, that coincides with the IMR, in addition to the transmitted at least one interfering signal, and wherein the impact of the further desired signal is to be cancelled out by the receiving node when performing the interference measurement.

18. The method of claim 1, wherein the transmitted at least one interfering signal is an isotropic signal.

19. The method of claim 1, further comprising the step of: determining an expected spatial signature of an intended data transmission to the receiving node;
applying said expected spatial signature when transmitting said at least one interfering signal.

20. The method of claim 19, wherein said expected spatial signature is determined based on respective buffer status and historic CSI reports of the receiving node and at least one further receiving node served by the transmitting node.

21. The method of claim 1, wherein said determined IMR is a subset of a set of TFREs upon which said receiving node is configured not to expect data transmissions from any one of said at least one transmission point.

22. The method of claim 21, wherein said set of TFREs is a set of zero power Channel State Information-Reference Signal, CSI-RS, configurations.

23. The method of claim 1, wherein said determined IMR applies for any receiving node served by the transmitting node.

24. A transmitting node for enabling a receiving node to perform measurements on interference, the transmitting node being configured to be connectable to at least one transmission point in a wireless communications system, wherein receptions at the receiving node are susceptible to interference caused by transmissions from the at least one transmission point, the transmitting node CHARACTERIZED IN comprising:
processing circuitry configured to determine an interference measurement resource, IMR, comprising a set of Time-Frequency Resource Elements, TFREs, upon which the transmitting node is expected to transmit interference, the processing circuitry further configured to transmit as said interference, via the at least one transmission point, at least one interfering signal on said IMR, wherein the at least one interfering signal comprises a desired signal, that is expected to be decoded or coherently measured upon by the receiving node or another node served by said transmitting node, and another signal, that is not expected to be decoded or coherently measured upon by any node served by said transmitting node, the processing circuitry further configured to transmit the desired signal in place of the another signal as said at least one interfering signal on one or more TFREs of the IMR when the at least one transmission point is to transmit the desired signal to the receiving node or to the another node served by said transmitting node, the processing circuitry further configured to transmit the another signal on TFREs of said IMR where no desired signal is transmitted and to mute the another signal on TFRE's of said IMR where the desired signal is transmitted.

25. The transmitting node of claim 24, the processing circuitry further being configured to select, for a subframe to be transmitted, whether to transmit the desired signal or the another signal on the one or more TFREs of the IMR.

26. The transmitting node of claim 24, wherein the desired signal is expected to be decoded by the receiving node or another node served by said transmitting node.

27. The transmitting node of claim 24, wherein the desired signal is a data signal transmitted on the Physical Downlink Shared Channel.

28. The transmitting node of claim 24, wherein transmissions from different transmission points are coordinated in order to control interference and/or improve received signal quality in the wireless communications system.

29. The transmitting node of claim 24, wherein the transmitting node is configured to use the interference measurements for link adaptation of a communication link between the transmitting node and the receiving node, the processing circuitry further configured to:
receive, via the at least one transmission point, a Channel State Information, CSI, report from the receiving node, wherein the CSI report is based at least in part on interference measurements performed by the receiving node on said IMR; and transmit, via the at least one transmission point, a data or control signal to said receiving node using a resource allocation and/or link adaptation that is based, at least in part, on said CSI report.

30. The transmitting node of claim 24, wherein the processing circuitry is further configured to:
instruct, via the at least one transmission point, the receiving node to measure interference on said IMR.

31. The transmitting node of claim 24, wherein the at least one transmission point comprises a composition of transmission points and wherein the processing circuitry is configured to transmit the at least one interfering signal by transmitting a respective interfering signal on said IMR via each transmission point in said composition of transmission points.

32. The transmitting node of claim 31, wherein the processing circuitry is configured to select said composition of transmission points so that it enables the receiving node to measure interference applicable to at least one transmission hypothesis for which the receiving node is to report Channel State Information, CSI, to the transmitting node.

33. The transmitting node of claim 31, wherein the processing circuitry is configured to receive, via an interface to a controlling node, said composition of transmission points, wherein the controlling node is configured to select said composition of transmission points so that it enables the receiving node to measure interference applicable to at least one transmission hypothesis for which the receiving node is to report Channel State Information, CSI, to the transmitting node and to coordinate transmissions from the at least one transmission point with transmissions from at least one further transmission point controlled by a further transmitting node in said wireless communication system.

34. The transmitting node of claim 24, wherein the processing circuitry is configured to determine the IMR so that it coincides with Time-Frequency Resource Elements, TFREs, of a Cell Specific Reference Signal, CRS, configuration.

35. The transmitting node of claim 34, wherein the processing circuitry is configured not to transmit CRS from the at least one transmission point on the TFREs of the CRS configuration.

36. The transmitting node of claim 35, wherein the processing circuitry is configured to coordinate transmissions via the at least one transmission point with transmissions from a neighbouring transmission point from which CRS is transmitted on the TFREs of the CRS configuration.

37. The transmitting node of claim 24, wherein the processing circuitry is configured to determine the IMR so that it is covered by Time-Frequency Resource Elements, TFREs, of a Channel State Information-Reference Signal, CSI-RS, configuration applied for the receiving node, and wherein the impact of the CSI-RS is to be cancelled out by the receiving node when performing the interference measurement.

38. The transmitting node of claim 24, wherein the processing circuitry is configured to determine the IMR so that it is covered by Time-Frequency Resource Elements, TFREs, of a zero power Channel State Information-Reference Signal, CSI-RS, configuration applied for the receiving node.

39. The transmitting node of claim 24, wherein the processing circuitry is configured to transmit, via any one of said at least one transmission point, a further desired signal expected to be decoded or coherently measured upon by any of the nodes served by said transmitting node on at least one Time-Frequency Resource Element, TFRE, that coincides with the IMR, in addition to transmitting the at least one interfering signal, and wherein the impact of the further desired signal is to be cancelled out by the receiving node when performing the interference measurement.

40. The transmitting node of claim 24, wherein the at least one interfering signal is an isotropic signal.

41. The transmitting node of claim 24, wherein the processing circuitry is further configured to determine an expected spatial signature of an intended data transmission to the receiving node and to apply said expected spatial signature when transmitting said at least one interfering signal.

42. The transmitting node of claim 41, wherein the processing circuitry is further configured to determine said expected spatial signature based on respective buffer status and historic CSI reports of the receiving node and at least one further receiving node served by the transmitting node.

43. The transmitting node of claim 24, wherein the processing circuitry is configured to determine said IMR as a subset of a set of TFREs upon which said receiving node is configured not to expect data transmissions from any one of said at least one transmission point.

44. The transmitting node of claim 43, wherein said set of TFREs is a set of zero power Channel State Information-Reference Signal, CSI-RS, configurations.

45. The transmitting node of claim 24, wherein the processing circuitry is configured to apply said IMR for any receiving node served by the transmitting node.

* * * * *